(12) United States Patent
Hughes et al.

(10) Patent No.: US 7,856,498 B2
(45) Date of Patent: Dec. 21, 2010

(54) COLLABORATIVE ALERT MANAGEMENT AND MONITORING

(75) Inventors: Randall L. Hughes, Centennial, CO (US); Mark Matson, Hillsboro, OR (US); Robert Madden, Mableton, GA (US); Michael Goldberg, Centennial, CO (US)

(73) Assignee: Sybase, Inc., Dublin, CA (US)

( * ) Notice: Subject to any disclaimer, the term of this patent is extended or adjusted under 35 U.S.C. 154(b) by 189 days.

(21) Appl. No.: 12/147,082

(22) Filed: Jun. 26, 2008

(65) Prior Publication Data

US 2009/0327429 A1 Dec. 31, 2009

(51) Int. Cl.
*G06F 15/173* (2006.01)
(52) U.S. Cl. ...................... 709/224; 709/223
(58) Field of Classification Search ................. 709/223, 709/224
See application file for complete search history.

(56) References Cited

U.S. PATENT DOCUMENTS

| | | | |
|---|---|---|---|
| 7,010,588 B2 * | 3/2006 | Martin et al. ............... | 709/223 |
| 7,457,872 B2 * | 11/2008 | Aton et al. ................... | 709/224 |
| 7,467,183 B2 * | 12/2008 | Arcuri et al. ................ | 709/203 |
| 7,636,424 B1 * | 12/2009 | Halikhedkar et al. ..... | 379/15.01 |
| 2006/0288100 A1 * | 12/2006 | Carson et al. ............... | 709/224 |

\* cited by examiner

*Primary Examiner*—Yemane Mesfin
(74) *Attorney, Agent, or Firm*—Sterne, Kessler, Goldstein & Fox P.L.L.C.

(57) ABSTRACT

Methods, systems, and computer program products for dynamically monitoring, processing, and managing alerts are described herein. In an embodiment, the method operates by receiving messages that are either alerts or responses to existing alerts. The messages are parsed to determine if whether they are alerts or responses to alerts. Actions including updating alert states and storing alert data are executed, and then the method sends notifications regarding the alert messages and responses to a collaboration list of registered subscribers that dynamically expands over time based upon alert escalations. The method then determines whether additional messages have been received; and performs actions associated with these additional messages until there are no remaining alerts or alert responses to process. The method stores updated alert and response data in a repository so that the alerts and responses can be monitored and managed.

32 Claims, 12 Drawing Sheets

UAS Roles Configuration Interface

UAS Subscription Configuration Interface

FIG. 6 UAS Target Instance Configuration Interface

FIG. 7

UAS Alert Type Configuration Interface

UAS Channel Configuration Interface

UAS Runtime Properties Configuration Interface

UAS Maintenance Configuration Interface

COLLABORATIVE ALERT MANAGEMENT AND MONITORING

BACKGROUND OF THE INVENTION

1. Field of the Invention

The present invention is generally directed to managing alerts from initial notification through resolution within business intelligence systems, and more particularly directed to collaboratively managing alerts and responses to alerts in a collaboration model.

2. Background

Conventional alert management systems use publish and subscribe models, but lack an architecture that allows collaborative management and distribution of alerts. Traditional alert management products enable users to publish and track alerts, but lack functionality to enable alert stake holders to collaboratively manage alerts during their entire lifecycles. The conventional approach to alert handling is to spread alert management over several products and components as opposed to a unified alert management system.

Traditional alert management systems are distributed amongst often unrelated components that are unable to present unified historical alert information to users for analysis. These systems typically do not compare current alerts with historical patterns to detect problems or opportunities automatically. Most alert management applications to date have focused on alert tracking and reporting and are not integrated with a business activity monitoring system.

SYBASE™ BIZTRACKER™ is an example of a currently available business activity monitoring solution with an alert management component. Current alert management systems and components lack a system-wide conceptual perspective for collaboratively managing alerts. Further, current methods and systems have not implemented a cohesively managed alert management subsystem.

Accordingly, what is needed are systems, methods, and computer program products that allow collaborative alert management by allowing users to track alerts as alerts transition from state to state in an alert lifecycle. What is further needed are systems, methods, and computer program products that support alert state management and alert lifecycle tracking.

BRIEF SUMMARY OF THE INVENTION

The present invention includes system, method, and computer program product embodiments for managing, aggregating, tracking, and correlating alerts. Methods and systems to manage, monitor, aggregate, and publish alerts are presented. The system, method, and computer program product embodiments disclosed herein perform alert management, publication, and monitoring. An embodiment of the present invention includes a Unified Alert Service (UAS). The UAS is a component that uses a publication and subscription model to manage the distribution of alerts. According to an embodiment of the invention, there are two main types of alerts supported by the UAS. These two main types are managed alerts, wherein UAS maintains at least state information pertaining to the alert; and unmanaged alerts, wherein UAS maintains a record of the alert but does not actively track the unmanaged alert's state.

Embodiments of the invention provide managed alert functionality such as a means of responding to an alert and alert escalation. Alert escalation is a means of notifying a new set of users of an alert via escalation channels. New alert messages or instances come in on one or more channels, which users can express interest in via subscriptions. Subscriptions represent an intersection between a user, a channel, and a target. A target represents a transport type (i.e., email) used to deliver notifications associated with alerts and responses. Responses to a managed alert trigger notifications. Notifications regarding responses are delivered to users who have expressed interest in the corresponding alert. In embodiments of the invention, a user indicates interest in an alert by subscribing to one or more channels. For example, a user may register interest in a set of alerts by establishing registered subscriptions to one or more channels.

The present invention provides systems, methods, architectures, and computer program products for dynamic, extensible, and collaborative alert management. Embodiments of the present invention provide additional functionality beyond currently available alert management systems, such as web-based graphical user interfaces that allow users and administrators to respond to alerts and an administrative console which allows administrators to configure alert escalation, whereby alert notifications are sent to new sets of users via escalation channels. According to an embodiment of the invention, a response to a managed alert triggers a notification which is delivered to registered subscribers, wherein registered subscribers are users who have expressed interest in the corresponding alert via a subscription to one or more channels. According to an embodiment of the invention, a graphical user interface allows configuration of channels, wherein channels are virtual names that alerts can be affiliated with.

An embodiment of the present invention builds on the Alert Management Component of the SYBASE™ BIZTRACKER™ product.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the embodiments of present invention and, together with the description, further serve to explain the principles of the invention and to enable a person skilled in the relevant art(s) to make and use the invention.

FIG. 7 depicts a GUI for UAS alert type configuration, according to an embodiment of the invention.

Figure 1:
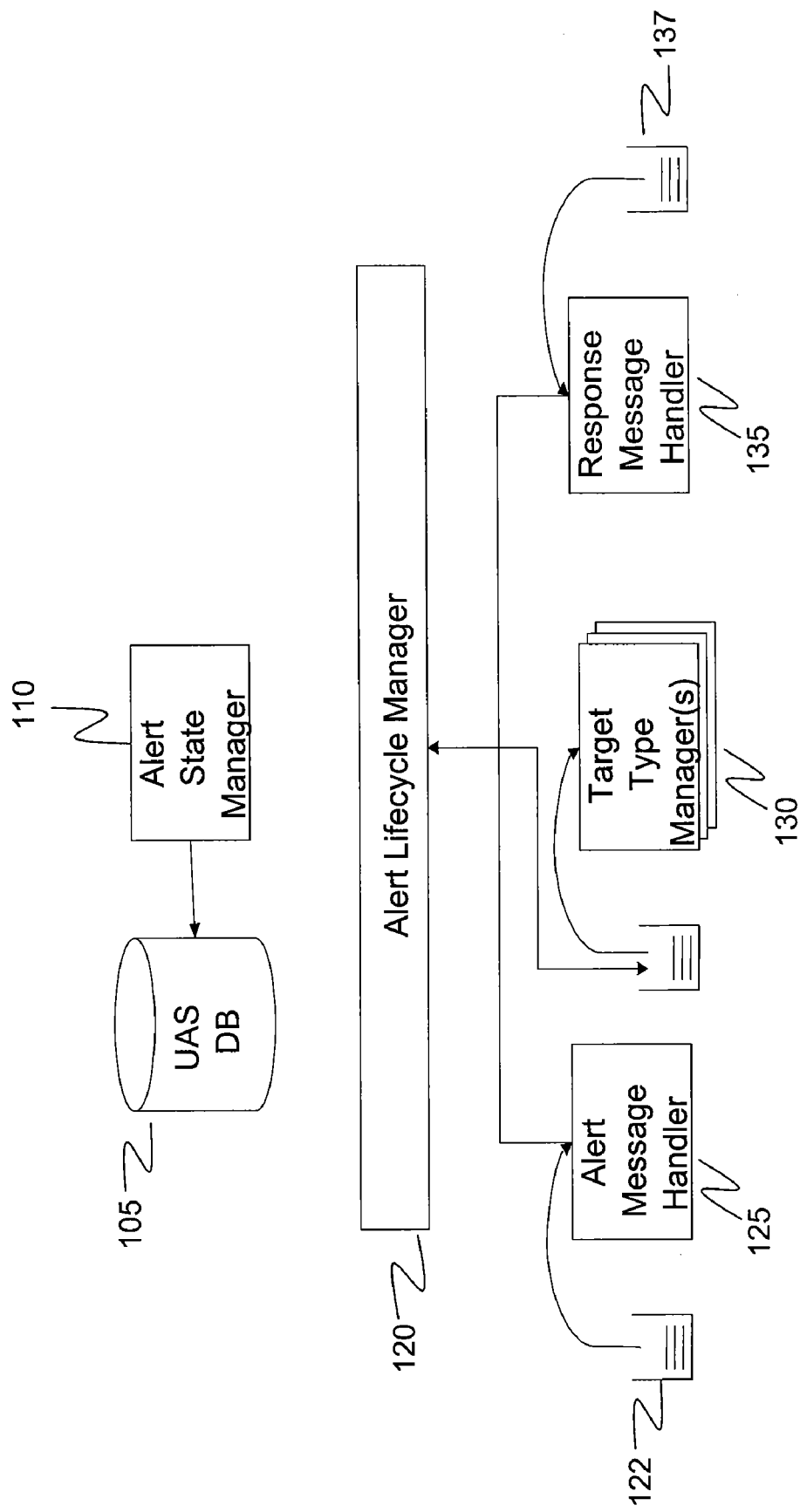
FIG. 1 illustrates the high-level architecture for the Unified Alert Service (UAS), according to an embodiment of the invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION 1.0 Overview of the Invention

The present invention is directed to systems, methods, and computer program products for managing, aggregating, and correlating alerts. In an embodiment, the invention operates by use of a Unified Alert Service (UAS). As used herein, an alert is a message sent to an UAS that includes alert information. Alert messages may be system alarm messages triggered by a system fault, a server reboot (scheduled or unscheduled), a server crash, a server shutdown (scheduled or unscheduled), a software program exception, a data file access violation, a database access violation, deletion of database records, a security breach (i.e., entry of a certain number of invalid passwords), and other events that users have expressed interest in.

In an embodiment, UAS makes use of the Java Platform, Enterprise Edition (Java EE) architecture and utilizes message driven JavaBeans for messaging as well as other JavaBeans for managing alert state information. An embodiment of the present invention uses Extensible Markup Language (XML) for formatting alert messages and as the format for alert data transmission. For example, UAS may use standard extensible Stylesheet Language (XSL) as a means of transforming alert data where possible.

According to an embodiment of the invention, the UAS will also use Java logging facilities for debugging and logging information. For example, UAS may log various amounts of information ranging from method calls to informational messages by taking full advantage of the range of levels supported by the Java logging facility.

UAS relies on the security of a MyAlerts Console, Alert Server Configuration graphical user interface (GUI), application servers hosting the UAS, and other information technology (IT) infrastructure in order to handle security.

UAS is used to deliver and manage Alerts. It provides a powerful mechanism for alert delivery, alert management, and target instances support.

The basic concepts and components of the UAS include a target instance, channels, alert types, subscriptions, and messages, wherein messages are either alerts or responses to existing alerts. These concepts and components are described below. UAS supports message state management and alert event lifecycle tracking as an alert moves through an alert state. Supported alert states include one or more of Active, Complete, Unmanaged, and Suppressed. For example, when a managed alert is generated, it is in an Active state; and after the issue associated with the alert is resolved, the state might change to Completed. Some users, such as managers, may only wish to receive notifications when alerts reach the Complete state so that they can track metrics for completed alerts without receiving notifications of prior states in each alert's lifecycle. The UAS processes unmanaged Alerts by only sending the initial Alert notification to all relevant subscribers and providing no further Lifecycle processing of the Alert instance.

Additionally, managed alerts can have an external Status associated with them. The list of possible statuses can be defined for an Alert Type and are controlled by the Notification messages sent to the UAS by a user for an Alert instance. As an example, an administrator may define alert statuses for an alert type that include Escalate, Work In Progress, Still Failing, Top Priority, Escalate Now, and Complete. A Status has an associated Alert state (one or more of Active, Complete, and Escalate) that the Alert instance transitions to when the Status is selected by a user during the Alert Lifecycle Management process. In the case of the Escalate state, Alert escalation is triggered but the Alert remains in the Active state. A special Status called Reactivate is available for Completed Alert instances. The Reactivate status can always be selected by users to make the Alert instance Active again. Default statuses include Escalate Now and Complete, which cause associated default Alert state changes to occur when received in a Notification message for an Alert instance.

1.1 Unified Alert Service Architecture

FIG. 1 illustrates the high-level architecture 100 for the UAS, according to an embodiment of the invention. The high-level message flow for an alert is for Alert Message Handler 125 to pick an alert message off of queue 122 and to hand the message off to the UAS Engine to be handled by Alert Lifecycle Manager 120. In an embodiment of the invention, alerts can be generated from a business process automatically or triggered based upon user-defined fault criterion. As would be appreciated by those skilled in the relevant art(s), alerts can also be generated by any computer program capable of queuing an XML document conforming to the Alert schema. Alert Lifecycle Manager 120 then instructs Alert State Manager 110 store the alert in UAS database 105.

Alert Lifecycle Manager 120 processes subscriptions to determine Alert recipients for an alert. This is done by determining the intersection of subscription channels with the channel list in the alert information. The information in each subscription can include substitution variables which are resolved using the alert contents. In an embodiment, substitution variables are used to allow a single subscription to refer to a list of alert targets contained in the alert information itself, thus allowing a one-to-many recipient relationship defined by the alert sender instead of the one-to-one relationship of the usual Subscription instance. The processed list of recipients is referred to as a collaboration list. The collaboration list is passed to Alert State Manager 110 as the current recipients for this alert instance. The collaboration list can grow as subsequent alert escalations occur over time. Alert Lifecycle Manager 120 then requests that Alert State Manager 110 builds a DriverAlert for each alert recipient's target and passes the DriverAlerts onto multiple Target Type Managers 130. Each Target Type Manager 130 is responsible for a set of targets of a given type. Target types can include one or more of JavaMail or JMS. Target Type Manager 130 then delivers the alert notification to its final destination.

According to an embodiment of the present invention, the UAS allows collaboration lists of Alert notification recipients to dynamically expand over time as Escalations occur, and provides 'communities' of participants for resolving an alert (i.e. resolving the fault associated with the Active Alert instance).

Responses are handled in a similar fashion. Response Message Handler 135 picks up response messages off response queue 137 and hands it off to Alert Lifecycle Manager 120, which requests that Alert State Manager 110 to update UAS database 105 and Alert Lifecycle Manager 120 updates its internal state. The Alert Lifecycle Manager 120 depends on the Alert State Manager 110 for the state of each Alert. Thus, the Alert Lifecycle Manager 120 state is transient. Alert Lifecycle Manager 120 then delivers an alert notification with updated state information to the registered subscribers for the alert via Target Type Managers 130.

According to an embodiment, Alert Lifecycle Manager 120 requests all alert notifications from Alert State Manager 110, which uses the current collaboration list for that Alert instance. In this way, Alert State Manager 110 controls notices delivered to the dynamically expanding and managed list of collaborators. In an embodiment, collaboration list comprises a group of registered subscribers responsible for resolving an alert. In another embodiment, the collaboration list comprises a group of registered subscribers interested in an alert.

Alert State Manager 110 maintains the list of targets for notification delivery which is processed by the Alert Lifecycle Manager 120 and passed to the appropriate Target Type Manager 130.

A registered subscriber can be any client subscriber and is not synonymous with an end-user or human user. A user subscribes to a channel and a target, but users can have as many subscriptions to channel and target combinations as needed. It is possible for a user to receive multiple notifications for a single alert or alert escalation based upon multiple, overlapping subscriptions. A subscription is the intersection of a user, a channel, and a target. Although a subscription may reference only a single target, a target can also be a substitution variable that references a list of targets and associated parameters in the original Alert message. The user and channel cannot be a substitution variable.

A new alert instance will come in on one or more channels. In an embodiment, Alert Lifecycle Manager 120 processes alerts based upon newly triggered alerts coming in on one or more channels by determining which users, if any, are subscribed to these channels. Target Type Managers 130 then determine which targets to send notifications to based upon the targets in the subscriptions. Alert State Manager 110 maintains a list of targets for notification delivery which is processed by Alert Lifecycle Manager 120 and passed to the appropriate Target Type Manager 130.

When alerts are escalated, subscriptions for the escalated channels are determined by Alert Lifecycle Manager 120 for the escalated alerts, and the UAS Engine requests that Alert State Manager 110 add the new recipients to the list of Collaborators for the Alert instance. The Alert Lifecycle Manager then causes a notification to be sent to all recipients in the newly expanded list of Collaborators.

Other configurations of the alert processing components depicted in FIG. 1 will be apparent to persons skilled in the relevant art(s).

In one embodiment, Alert Message Handler 125 is a message driven JavaBean that is responsible for accepting alert messages from JMS queue 122 and then making the appropriate calls via a client application programming interface (API) to Alert Lifecycle Manager 120 so that the alert can be persisted, by Alert State Manager 110 and its state can be managed if it is a managed alert. In an embodiment, Alert Lifecycle Manager 120 is configured to perform tasks related to subscription processing and alert distribution to targets. Alert storm suppression and alert escalation are also performed by Alert Lifecycle Manager 120. Alert suppression and escalation is discussed in greater detail in section 3.2 below.

According to one embodiment of the present invention, response message handler 135 is a message driven JavaBean configured to accept response messages from JMS response queue 137 and make the appropriate calls via a client API to Alert Lifecycle Manager 120 so that in order to persist the response, via Alert State Manager 110, and update the state of the alert. According to an embodiment, each response is associated with an existing, active alert by an alert ID, wherein the alert ID uniquely identifies the alert instance.

Response Message Handler 135 is significantly similar to Alert Message Handler 125 in function with the exception of the calls that will be made against Alert Lifecycle Manager 120. In an embodiment, Response Message Handler 135 can reuse message reception code available in Alert Message Handler 125 and Response Message Handler 135 merely implements its own class for interacting with Alert Lifecycle Manager 120.

According to an embodiment of the invention, Target Type Managers 130 are message driven JavaBeans that listen on a topic for alert and response messages intended for a certain target type. When an alert or response message intended for a target type is detected, a Target Type Manager 130 then delivers the corresponding notification using the method corresponding to the target type for the message being processed. Target Type Manager 130 serves a similar purpose as drivers in UAS architecture 100. Each Target Type Manager 130 is also responsible for delivering alert notifications to a certain target type such as JavaMail. Each target type supports a set of parameters that are defined in UAS database 105 and this information is used to drive configuration of target instances as well as subscriptions for a target instance.

One of the primary differences between current alert management systems and the embodiment of the present invention depicted in FIG. 1 is that target type managers 130 can handle several target instances of the same target type. A driver may represent a single target, but this does not require a user to package and deploy a new application on the application server to handle a new target. The UAS can handle multiple alert targets for each alert type. The improvement provided by embodiments of the present invention is that UAS architecture 100 places no limit on the number of target instances that can be handled by a Target Type Manager 130. An advantage of embodiments of the present invention is that the number of target instances does not degrade system performance and has little bearing on system configuration. Another advantage of embodiments of the invention is that the majority of the code in existing drivers is shared among most drivers so that changes will be made to most drivers in one place in order to convert them to the new Target Type Manager 130 model.

In accordance with an embodiment of the present invention, substitution variables provide the ability for a subscription to be variable. This may be accomplished by using variables in the variables section of the Alert XML code to produce virtual subscriptions at delivery time. In one embodiment, variables used for this purpose are AMS_EMAIL_ADDRESS and AMS_USER_ID. These variables are grouped together using the group attribute of the variable.

2.0 Components of the Unified Alert Service

According to an embodiment of the invention, a Unified Alert Service (UAS) provides a mechanism to allow users to collaboratively manage outstanding alerts. For example, a mechanism described herein is a UAS comprised of components responsible for managing alerts generated and sent by other components. Besides a human user who needs to manage alerts, a software application or agent sometimes needs to manage alerts. Accordingly, unless specifically stated, the "user" as used herein does not necessarily pertain to a human being. In one embodiment of the present invention, each alert can have a current status of either active, not managed, completed, or escalated. UAS allows users to manage and monitor alerts during the life cycle of alerts, from initial notification of an alert condition to alert resolution (i.e., completed state).

In an embodiment, a collaboration network is dynamically created by users self-subscribing to channels that have associated alerts which are issued by software components. The UAS is composed of a runtime engine and several administration and user tooling user interfaces (UIs). Software components introduce alerts into the UAS engine by sending it the Alert message containing the Alert ID, an initial list of channels over which the alert will flow, and optional enriched content. The basic components supporting the UAS collaboration model are described in the following paragraphs.

The UAS provides receive-response messaging, wherein the UAS can receive an alert message, and subsequently respond to form a closed message loop.

2.1 Alert Suppression

Figure 7:
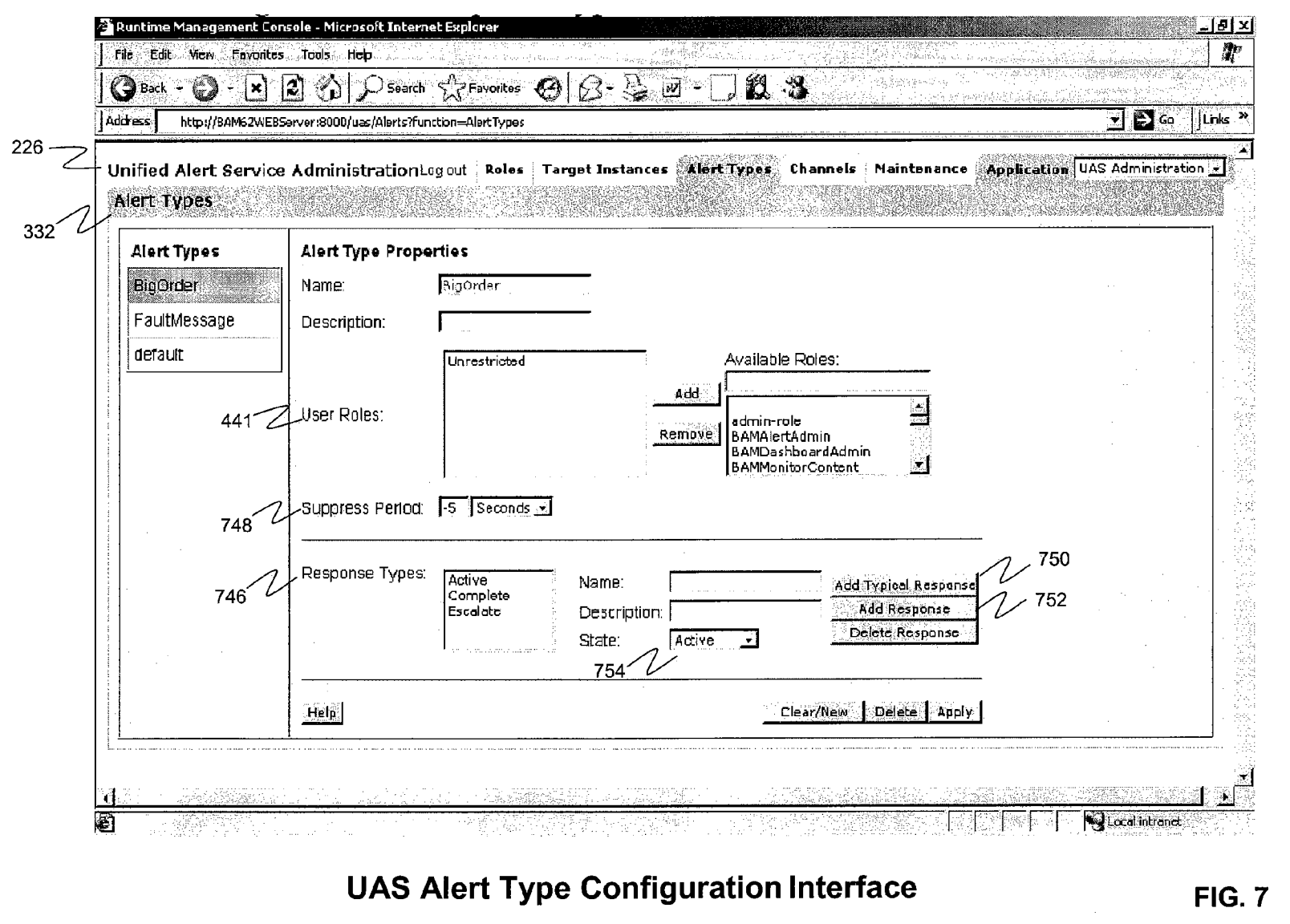

FIG. 7 depicts the UAS alert type configuration interface 332, in accordance with an embodiment of the invention. Alert suppression is enabled by use of an alert suppression key that is sent in as part of an Alert message, together with the Alert type and suppress period field 748 depicted in FIG. 7. Interface 332 enables alert suppression, whereby duplicate alerts are suppressed within specified periods of time. The durations of time (e.g., seconds, minutes, hours, or days) can be entered using suppress period field 748. In an embodiment, users and administrators identify when to suppress alerts by selecting alert suppression including a Storm Suppression key in the Alert XML message. For example, this key could be the IP address of a server. This would cause multiple subsequent alerts of the same Alert type that were issued for the server with the IP address within the suppression period configured in suppress period field 748 to be suppressed. For example, if two alerts have the same alert type and suppression key selected, then they are regarded as same alert (i.e., duplicate alerts) and the second alert is discarded if the two alerts are within the same suppression period. In an embodiment, the suppression period is a tunable parameter entered in suppress period field 748.

2.2 UAS Runtime Behavior

Figure 2:
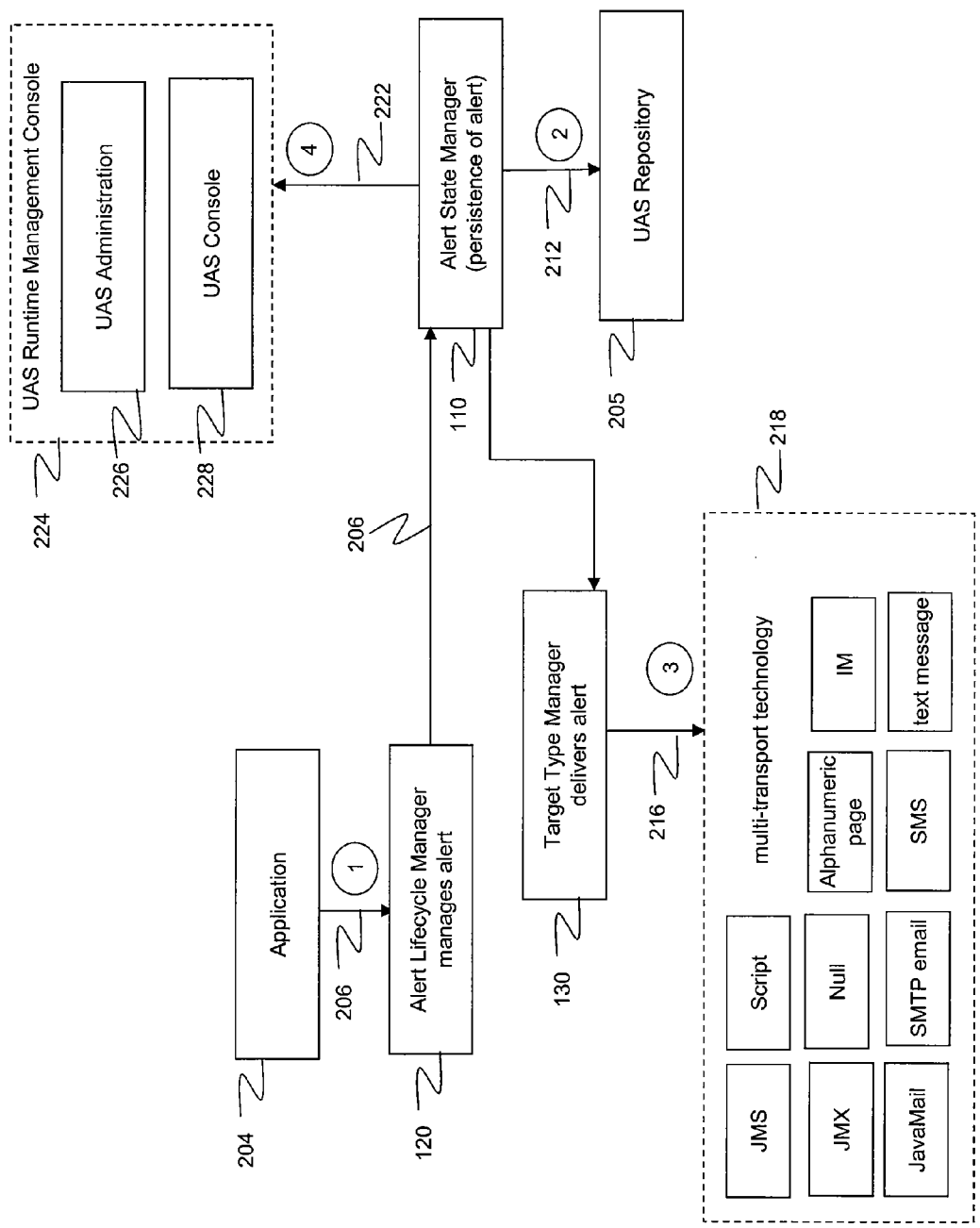
FIG. 2 illustrates the step-by-step sequence of alert processing of the UAS runtime, according to an embodiment of the invention.

FIG. 2 illustrates the step-by-step sequence of alert processing 200, according to an embodiment of the invention. The steps of alert processing workflow 200 are described with reference to the embodiments of FIG. 1. However, alert processing workflow 200 is not limited to those embodiments.

In step 1, client application 204 sends a JMS message 206 to the UAS inbound queue 122. Alert Lifecycle Manager 120 then picks up JMS message 206 from UAS inbound queue 122 and forwards JMS message 206 to Alert State Manager 110. In step 2 Alert State Manager 110 fetches the inbound Java Message Service (JMS) message 206, parses the message, saves the message details 212 in UAS repository 205, and forwards the message to Target Type Manager 130. The alert life cycle is subsequently managed by Alert Lifecycle Manager 120.

In step 3, Target Type Manager 130 checks the subscriptions to alert 206, and then delivers the alert by sending notifications 216 to each user that subscribes to channels that alert 206 arrives on. Users express interest in channels via one or more registered subscriptions. Each subscription includes a transport type 218. As depicted in FIG. 2, transport types 218 can be one or more of JavaMail, Simple Mail Transfer Protocol (SMTP) email, facsimile, JMS, Java Management Extensions (JMX), instant messages, text message, alphanumeric pages, Short Message Service (SMS) messages, script, null target instances, and other electronic communications means to receive and send alert messages.

In step 4, UAS Runtime Management Console 224 captures data 222 forwarded by Alert State Manager 110 so that a user can view, manage, and respond to the alert. As depicted in FIG. 2, UAS Runtime Management Console 224 is comprised of a UAS Administration interface 226 and a UAS console 228. UAS Administration interface 226 is described in detail in section 2.4 below.

2.3 Administration Interface

UAS also provides web console administration which allows users to view and manage alerts anywhere via a web-based user interface (UI).

Figure 3:
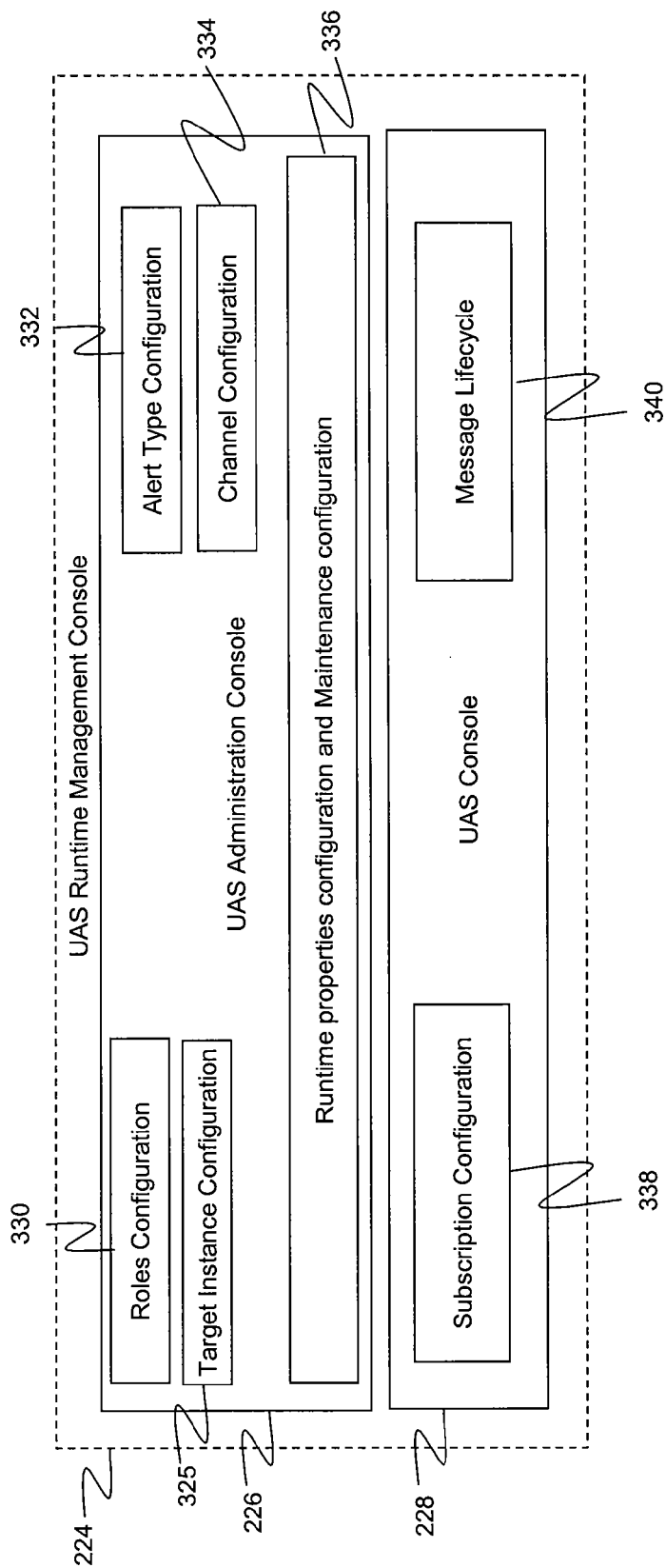
FIG. 3 illustrates the components of the UAS Runtime Management Console, according to an embodiment of the invention.

FIG. 3 illustrates the components of UAS runtime management console 224, according to an embodiment of the invention. UAS runtime management console 224 enables end users to configure alert metadata and view, mange or respond to alerts. As depicted in FIG. 3, UAS runtime management console 224 is comprised of UAS administration console 226 and UAS console 228. UAS console 228 is a console for UAS end users, and UAS administration console 226 is for UAS administrators. Together, these two consoles allow users and administrators to configure alert metadata, and view, manage, or respond to alerts.

In an embodiment, UAS administration console 226 includes several web-based graphical user interfaces: roles configuration 330, target instance configuration 325, channel configuration 334, runtime properties configuration and maintenance configuration 336. UAS console 228 includes user interfaces for subscription configuration 338 and message lifecycle management 340. These interfaces are described in the paragraphs below with reference to FIGS. 4-10.

Figure 4:
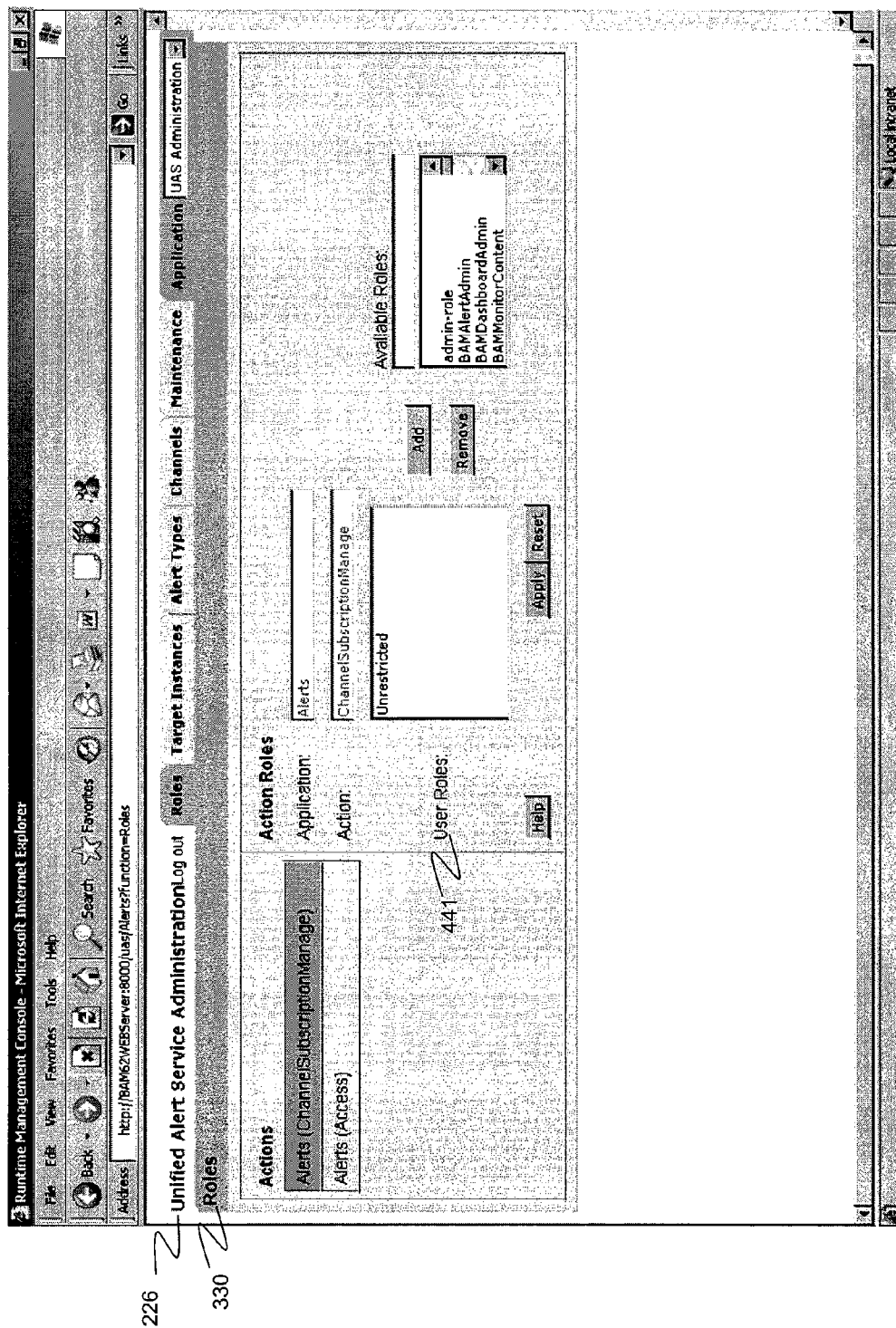
FIG. 4 depicts a graphical user interface (GUI) for Roles Configuration, according to an embodiment of the invention.

FIG. 4 depicts roles configuration interface 330, according to an embodiment of the invention. Roles configuration interface 330 is part of UAS administration console 226. Roles configuration interface 330 can be used by administrators to control access to alerting functionality. Roles configuration interface 330 can be used to set one of the predefined UAS roles in user role field 441. In accordance with an embodiment, user role field 441 can be used to set predefined roles including: the administrator roles of AlertAdmin and adminrole; ChannelSubscriptionManager, which grants permission to manage alerts, channels, and subscriptions of all UAS users; and Access, which grants permission to manage alerts and subscriptions for a specific user's ID.

According to an embodiment, roles configuration interface 330 depicted in FIG. 4 allows users to manage either of these roles by editing the configuration assigned to each role.

UAS enables alert escalation. For example, users can manually escalate alerts by setting certain response types using channel configuration interface 334. Alerts can also be automatically escalated when a pre-defined duration of time elapses (i.e., an escalation 'timeout'). Escalation timeout periods can also be nested whereby alerts are configured to go through multiple escalations after expiration of multiple, successive timeouts.

In an embodiment, the time duration for alert escalation is a tunable parameter that can be adjusted by administrators and users via the web console. UAS allows users and administrators to restrict delivery of alerts by use of notification filters. For example, alert delivery can be restricted to a specific alert state, or those that meet the criteria of a user-defined XML Path Language (XPath) filter. The criteria may be set via the web-based UI by administrators and users.

2.4 Subscriptions

A subscription identifies a single user, channel, and notification target.

Notification targets can include one of an email address, a short messaging system (SMS) destination, queued XML, a Web Service invocation, and others designated destinations for alert notifications. According to an embodiment of the present invention, users can subscribe to as many subscriptions as needed. In an embodiment, a subscription is an entry identifying the desire for a user to receive Alert Notifications on a specified target sent to a specified channel. A subscriber is not necessarily a person as a subscriber can be any client. Subscriptions represent the intersection or nexus between a user ID, a channel, and a transport technology. Channels are described in detail below. The UAS can be thought of as a collection of atomic subscriptions, wherein users can have multiple subscriptions.

Figure 5:
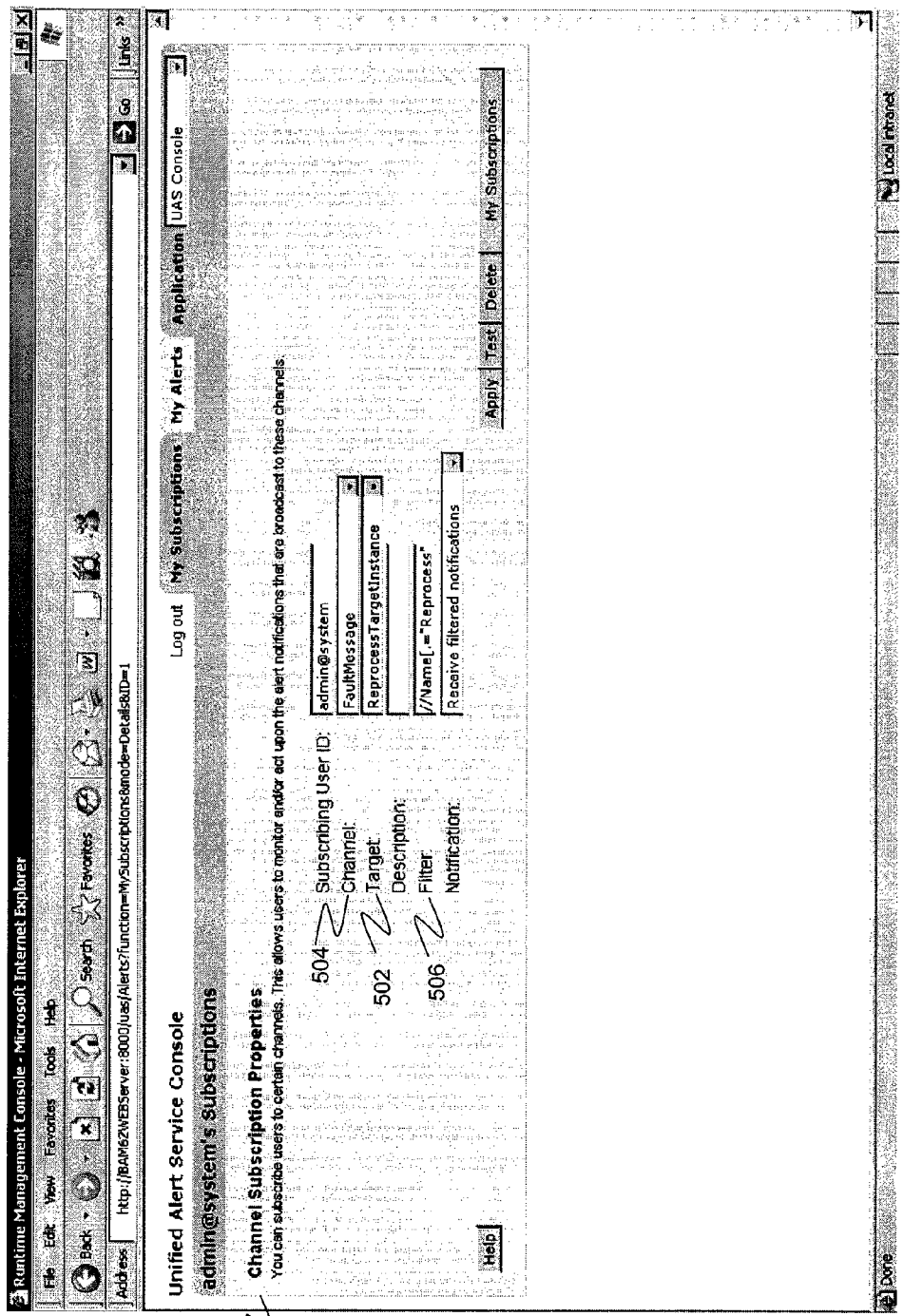
FIG. 5 depicts a GUI for UAS subscription configuration, according to an embodiment of the invention.

FIG. 5 depicts a subscription configuration interface 338, in accordance with an embodiment of the invention. A subscription uses a target instance 502 to transport messages to an alert destination channel 504. In an embodiment, the UAS then checks the subscription for each alert, and subsequently sends notification to users via the chosen message transport.

A user can also create a notification filter using subscription configuration interface 338. By setting an appropriate filter level using Filter field 506, users then receive only messages that conform to the filter level. For example, a user can configure a custom filter by defining an XPath expression. In an embodiment, when a user has successfully set up a subscription using subscription configuration interface 338, a test message is sent to the subscription target instance entered into target instance 502.

2.5 Targets

In accordance with an embodiment of the invention, a target is the destination for an Alert Notification and source for an Alert Response. A target is associated with a specific target type, wherein a target type is a definition template for a particular target technology. In an embodiment, multiple targets can be derived from a specific target type.

2.5.1 Target Instance

Target instances are concrete alert destinations. In accordance with an embodiment of the present invention, a target instance is the type of transport technology used to send and receive alert notifications. For example, UAS users can choose one or more of Simple Mail Transfer Protocol (SMTP) email, facsimile, Java Message Service (JMS), Java Management Extensions (JMX), instant messages, text message, alphanumeric pages, Short Message Service (SMS), script, null target instances, and other electronic communications means to receive and send alert messages.

In an embodiment of the invention, alerts are delivered based on a publication and dynamic subscription model. For example, an alert may be published to a channel, and a user can express an interest in the alert by subscribing to that channel. The alert is subsequently delivered over various transport technologies, wherein the transport technologies include one or more of email, JMS, SMS, and JMX. UAS provides for target transformation. For example, UAS implements an XSLT transformation for alerts with email or JMS targets.

Figure 6:
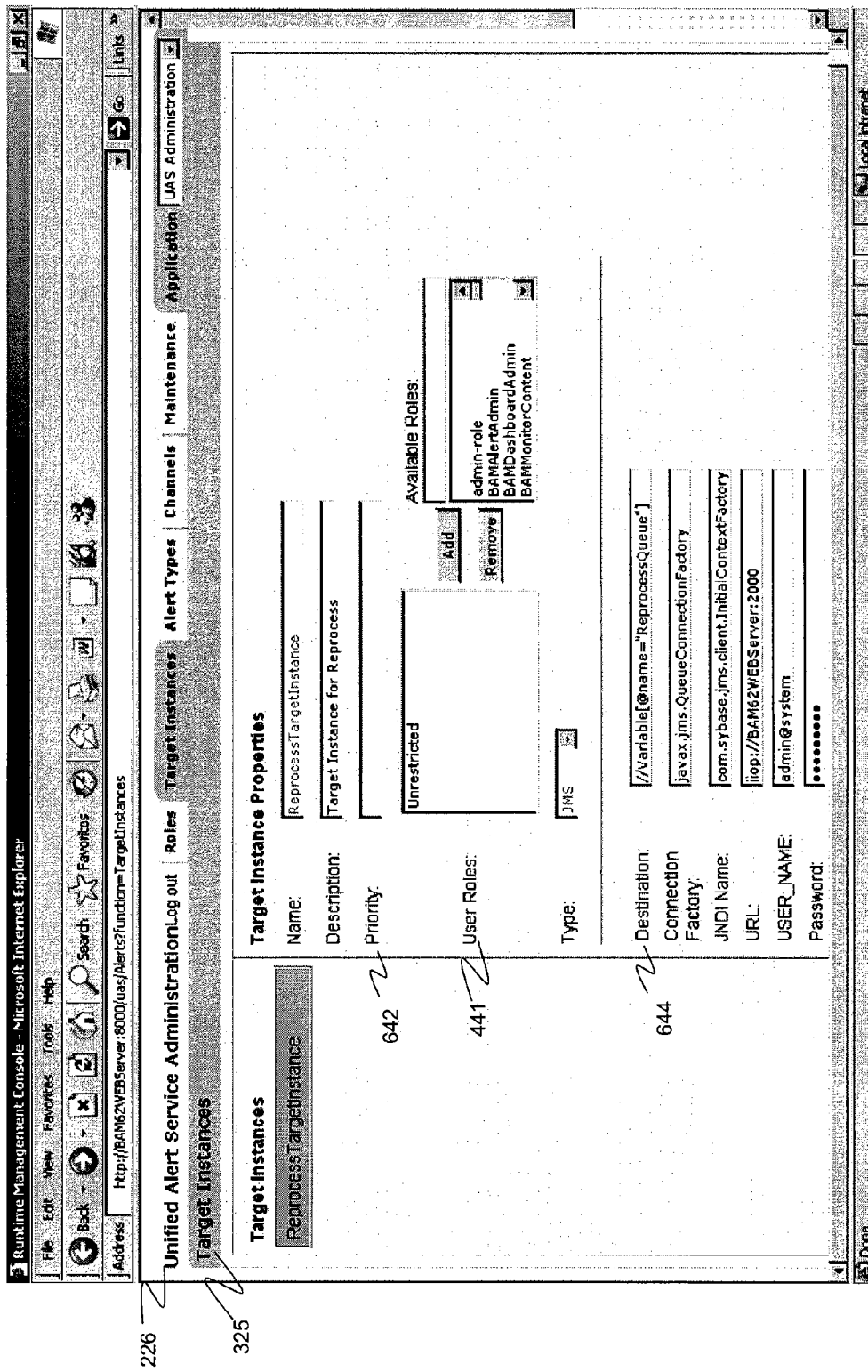
FIG. 6 depicts a GUI for UAS target instance configuration, according to an embodiment of the invention.

FIG. 6 depicts UAS target instance configuration interface 325 used to configure target instances, according to an embodiment of the invention. According to an embodiment, target instance configuration interface 325 is part of UAS administration console 226. Target instance configuration interface 325 enables support of multiple message transport technologies by allowing users to create different target instances to support a different transport technology. UAS supports email, JMS, JMX, Null, and script targets. The Null target indicates that an alert can only be viewed from UAS console 228, and no concrete destination can receive Null target messages. Users can prioritize targets by setting priority numbers in field 642, wherein larger numbers indicate higher relative priority than lower numbers. Target instances can be restricted by specifying roles entering a role into user role field 441 to control which users have right to use a particular target instance.

JMS, JMX and Java Mail target instances support XSLT transformation, which allows the original alert message to be displayed in different formats. For JMS and JMX targets, users can set the Destination field 644 to be an XML Path Language (XPath) expression to support a variable target. If a user requires XSLT transforms, a Templates button (not depicted in FIG. 8) can be pressed in order to import an appropriate transform template: either the existing XSLT template or a new XSLT expression to be input by the user. UAS users can select a target instance using target instance configuration interface 325, and depending on the target instance, UAS is able to transform alert messages. Alert content is formatted by UAS based on the display abilities of the selected target instance. For example, HyperText Markup Language (HTML) content can be provided for email target instances and Extensible Markup Language (XML) for JMS target instances. If a target instance is unavailable for some reason (i.e., due to an email server being down), UAS provides a mechanism to guarantee the delivery of the notification to the end user.

2.6 Alert Type Definition

According to an embodiment of the invention, an alert type definition identifies the notification text for an alert instance and an unlimited list of statuses an alert instance can be in or have. In accordance with an embodiment, alert instances are associated with an Alert Type in the Alert XML message. If the Alert Type is not identified in the Alert XML message, then the alert instance is unmanaged. A typical alert may have a list of response types/statuses including Active, Complete, and Escalate. The Response type list can be added to or changed, but must include at least one response type with a state transition to Complete. In an embodiment, a definition template is used to define special processing for alerts identified as a certain type. Alert types classify alert messages so that UAS can manage the lifecycle of alert messages based on a specific alert type.

Alert types are used to determine how Alert Lifecycle Manager 120 will process alerts associated with that Alert type. In this way, Alert types assist with processing groups of alert messages for each specific Alert type. According to an embodiment, alert types have different response types. These response types drive alert messages from one state to another in a lifecycle. For example, response types may include one or more of Active, Complete, and Escalate. In an embodiment, alerts have full lifecycles that include the following states: Active; Complete; Cancel, Unmanaged, Obsolete, and Suppressed. Response types can drive alerts into Active or Complete states. Other alert states such as Cancel, Unmanaged, Obsolete, and Suppressed are internal to Alert Lifecycle Manager 120. For example, when a managed alert is initially generated, it is in an Active state, and after the issue associated with the alert is resolved, the alert state will be set to Complete.

FIG. 7 depicts the UAS alert type configuration interface 332, in accordance with an embodiment of the invention. UAS alert type configuration interface 332 is used to determine how Alert Lifecycle Manager 120 will process alerts associated with that Alert type. According to an embodiment of the present invention, alert types are set in the Alert XML message in order to categorize alerts. For example, to constrain the list of specific Response Types and Statuses that a managed Alert can be set to, an administrator can use Response Type field 746 to configure a set of response types. Alert instances associated with that specific Alert type through the Alert XML will be constrained by the Alert Lifecycle Manager to only allow those Response Types and Statuses to be set. Alerts may be set to one of: Active, Complete, Escalate, Cancelled, or other response types.

For security purposes, administrators can restrict what Alert instances a user receives. Alert instances are associated with certain alert types. Administrators can assign a user role to an alert type. In an embodiment, a role can be entered into user role field 441 to assign a particular user role to an alert type. When Alert Lifecycle Manager 120 processes Alert instances associated with that alert type, only users that are members of the roles defined for the alert type are added to the list of Collaborators.

As discussed in section 2.2 above, to prevent an 'alert storm,' administrators can specify a suppression period to ignore duplicate alerts. The suppression period entered in the suppress period field 748 defines the time duration to ignore duplicate messages. According to an embodiment of the invention, there are four types of time suppression period time units that can be entered into suppress period 748: day, hour, minute and second.

In one embodiment of the present invention, the Add Typical Response button 750 can be used to add three default response types. Additionally, to add a custom response, an administrator can click the Add Response button 752 and choose the type of response required. Then an administrator can use alert type configuration interface 332 to edit the detail information of the response type. State 754 represents the message state after a user responds to an alert message at run-time with a given response type.

2.7 Channels

A channel represents a virtual destination to which user can subscribe to receive alerts. An alert action sends an alert message to a specified UAS channel. According to an embodiment, an Alert message contains a list of associated UAS Channels. Channels are virtual and therefore not associated with or limited to a specific transport technology such as email or JMX. Subscriptions, as described above, drive the transport technology used to deliver alert messages, not channels.

UAS uses a channel to pull end users out of specific transport technology and thereby make alert message destinations more meaningful. UAS uses channels to associate Alert messages with Subscriptions. This enables an alert message to be abstracted from the specific transport technology used to deliver the message.

According to an embodiment, a channel definition identifies the list of other channels an alert will escalate to after being in an unresolved state for a given period of time. Since an escalation channel is just another channel and can therefore have a list of escalation channels itself, a multi-level escalation tree can be created.

Figure 8:
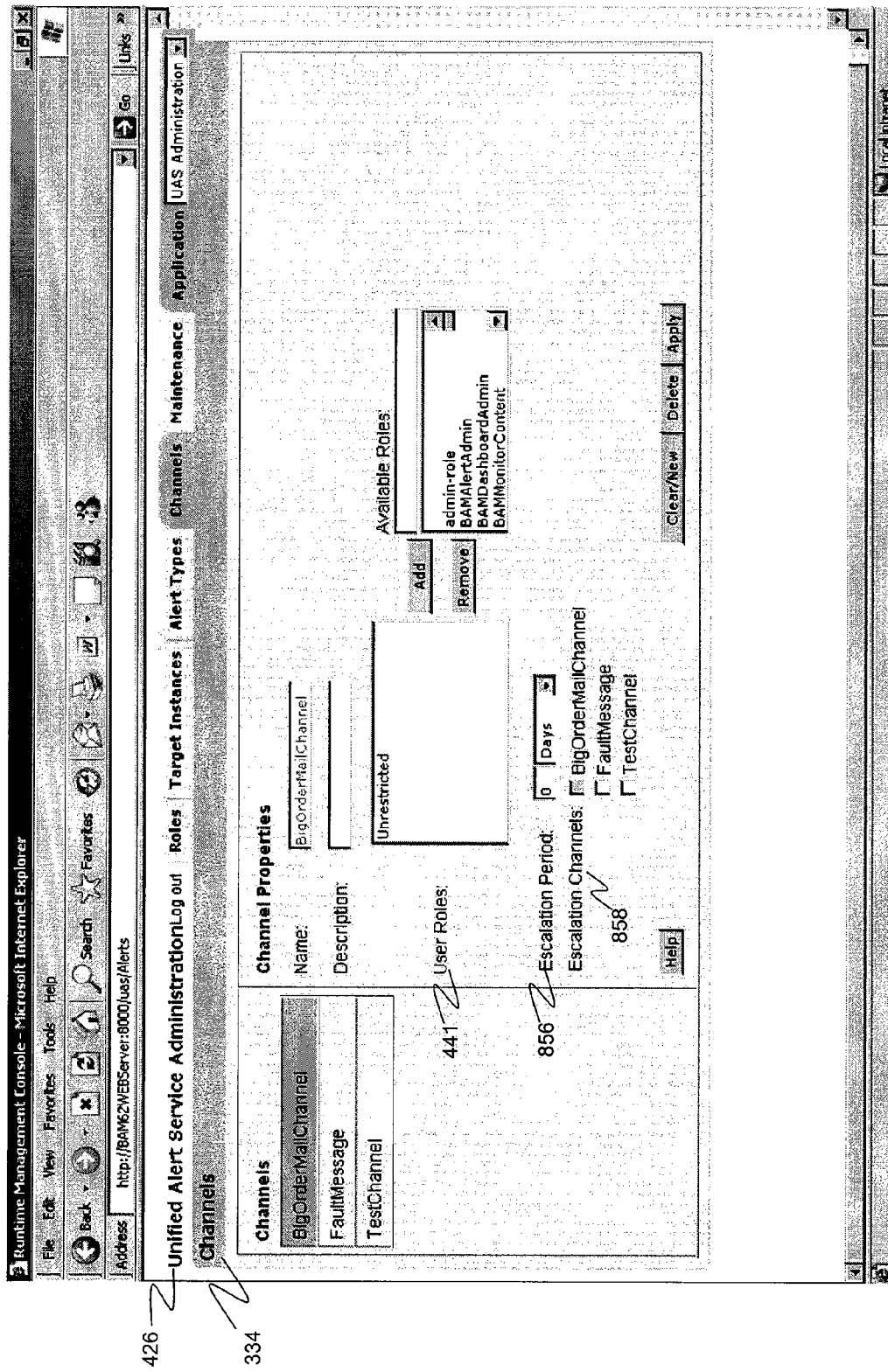
FIG. 8 depicts a GUI for UAS channel configuration, according to an embodiment of the invention.

FIG. 8 depicts an interface 800 for channel configuration, according to an embodiment of the invention. Interface 800 is used by administrators to configure the list of channels supported by the Unified Alert system. Interface 800 does not directly act on the list of currently active alert instances. Channels are virtual alert destinations, to which user can subscribe. For security purposes, administrators can use interface 800 to restrict the list of channels users can subscribe to by specifying user roles with user roles field 441. On a subscription screen, a user can subscribe to channels that specify roles that he is a member of.

In accordance with an embodiment of the invention, an administrator can use interface 800 to define additional channels that Active Alerts flowing on this channel will escalate to after an escalation period has expired without the Alert state becoming Complete. For example, if a user has subscribed to multiple channels with different targets, after expiration of an escalation period entered in Escalation Period field 856, an alert that had initially been sent to one target such as a user's work email address, the escalated alert will be sent to another target, such as a user's home email address. As would be appreciated by those skilled in the relevant art(s), other channels could contain completely different users, such as the next level of management in the user's organization. Another example is an escalation channel used to notify a higher management level when alerts associated with key systems remain unresolved (i.e. Active). An escalation period entered into Escalation Period field 856 represents the duration that automated escalation are processed. There are at least four types of escalation period time units: days, hours, minutes, and seconds. According to an embodiment, if an administrator does not use interface 800 to choose at least one escalation channel, an error will appears and prompt the administrator to save a configuration with an escalation channel entered into Escalation Channels field 858. This is true only if there is an Escalate response type defined. Otherwise, escalation channels are optional.

2.8 Unified Alert Service Engine

The main component driving the collaboration model is the Unified Alert Service (UAS) engine. Conceptually, the UAS engine can be thought of as a combination of Alert Lifecycle Manager 120 and Alert State Manager 110. The UAS engine manages all active alerts sent to it from software components by performing the following functions.

The UAS engine maintains the current collaboration network for each alert instance (i.e. the current list of targets from initial and escalated channels).

The UAS engine receives and processes alert status updates from targets. Alert status updates can include one or more of "change to status 'X'", "escalate immediately," "attach included information," and others status updates.

The UAS engine sends notices to targets as alert statuses and escalation levels change. Theses notices include: the alert id, text, status description, attached information, available responses, and escalation level.

The UAS engine escalates alerts which have exceeded the timeout threshold defined for associated channels. This has the result of expanding the current collaboration members for an alert instance. In an embodiment, alert escalation is the process of re-issuing Alert Notifications to one or more escalation channels, wherein an escalation channel is the channel used when an Alert is escalated. During alert escalation, subscriptions are identified for intersections with the escalation channels and any new collaboration members which have been added to the collaboration member list. The escalation notice is then sent to the entire list.

Figure 9:
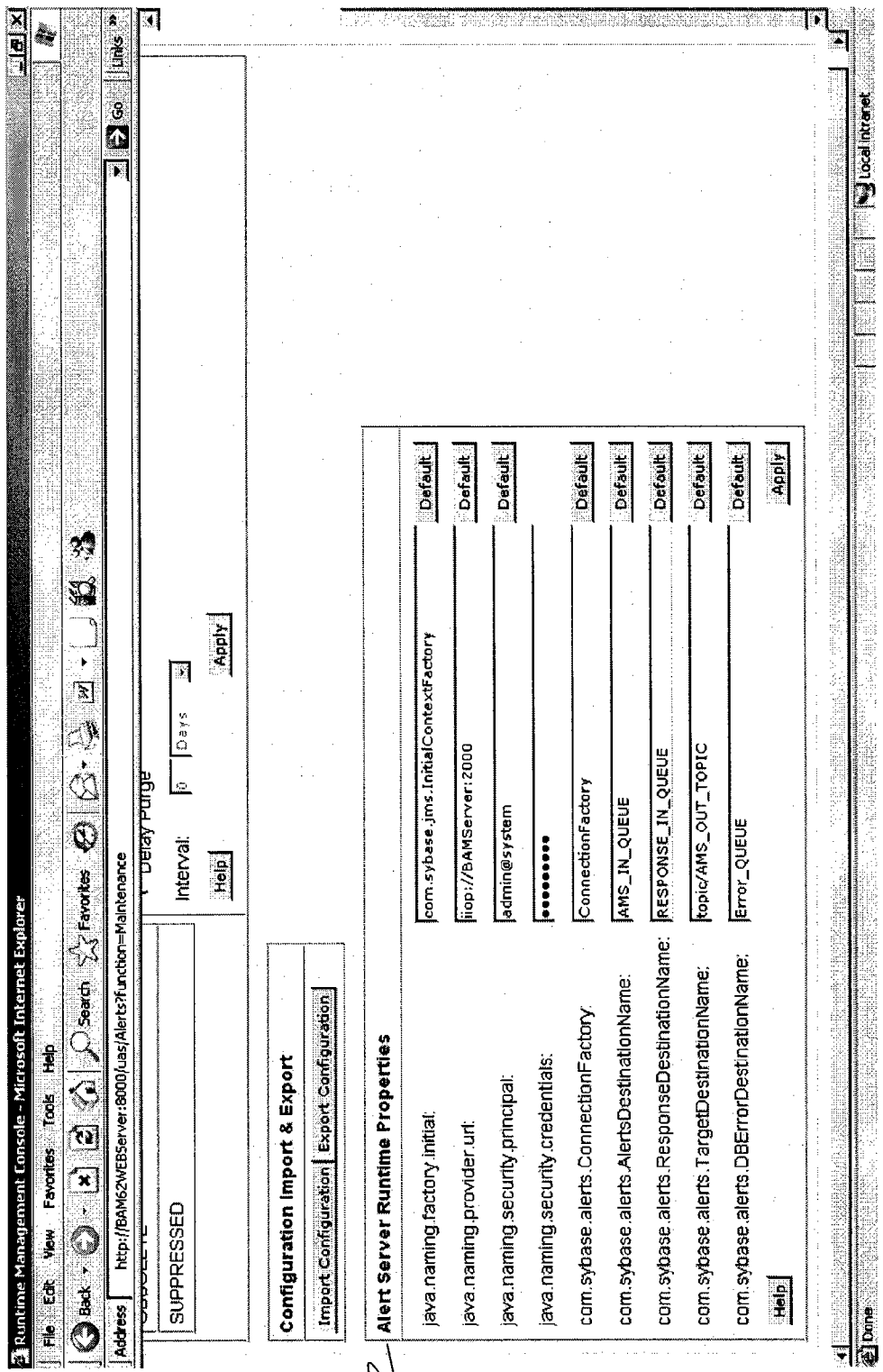
FIG. 9 depicts a GUI for UAS runtime properties configuration, according to an embodiment of the invention.

FIG. 9 depicts an interface 900 which can be used to configure runtime properties of the UAS server, according to an embodiment of the invention. Runtime properties configuration and Maintenance configuration interface 336 allows users and administrators to specify UAS Runtime properties required for UAS server and UAS engine startup. Although the UAS server and engine have default values, interface 900 can be used change some of these values when needed. Changes made via Runtime properties configuration and Maintenance configuration interface 336 take effect when the UAS server and engine next start up.

2.9 UAS Maintenance

Figure 10:
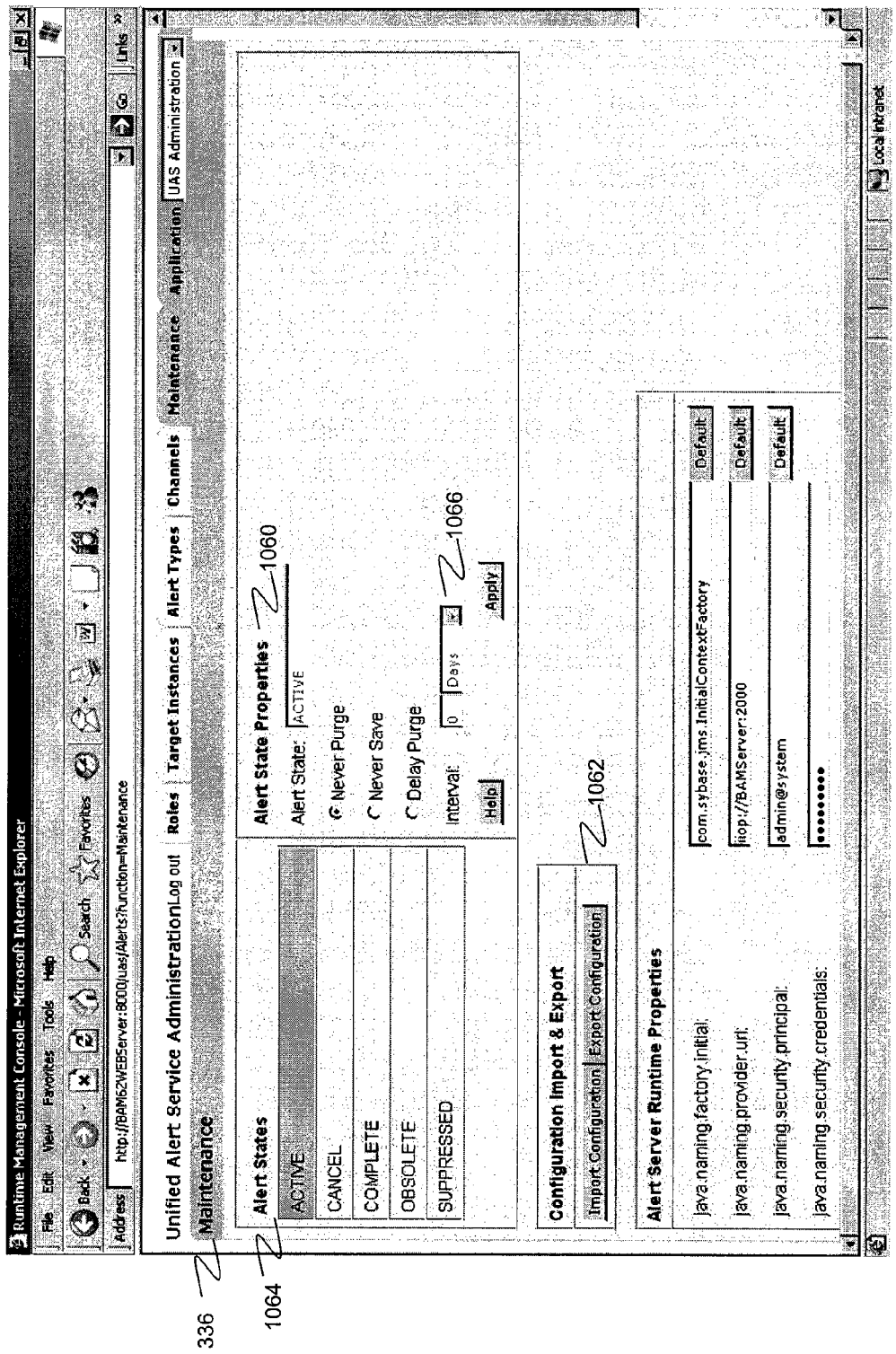
FIG. 10 depicts a GUI for UAS maintenance configuration, according to an embodiment of the invention.

FIG. 10 depicts an interface 1000 for UAS maintenance configuration, according to an embodiment of the invention. Administrators can configure alerts to be purged or retained through use of the Alert State Properties 1060 fields. According to an embodiment, Alert State Properties 1060 fields can be used to set how alerts will be managed in the UAS repository by having one of three auto-purge options per Alert State. Alert State properties 1060 such as Never purge, Delay purge, and Never Save can be chosen for alert types. According to an embodiment, the Never purge property is used to ensure that there is no auto-purge of an alert; the Never save property is selected to ensure that an alert is not saved in UAS repository 205 depicted in FIG. 2; and the Delay purge property is chosen to ensure that after an interval of time has passed, an alert will auto purge. If the Delay purge property is chosen, but the Interval Value 1066 is set to less or equal zero, the effect functionally equivalent to choosing the never purge property. For example, Active alerts can be set to not be purged by selecting the Never purge Alert State property. Similarly, Completed alerts can be set to be purged after 24 hours by selecting the Delay purge property and setting Interval Value 1066 to 24 hours. Likewise, Suppressed alerts can be set to not be saved by selecting the Never save property.

Administrators can also use Import and Export Configuration buttons 1062 to import an existing UAS configuration and export a current UAS configuration, respectively. For example, according to one embodiment, Import and Export Configuration buttons 1062 can be used to export an existing UAS configuration to an XML file or import a UAS configuration from an XML file.

In an embodiment, Runtime properties configuration and Maintenance configuration interface 336 allows administrators to choose from at least five Alert States 1064: active, cancel, complete, obsolete, and suppressed.

3.0 Structural and Operational Embodiments

Figure 11:
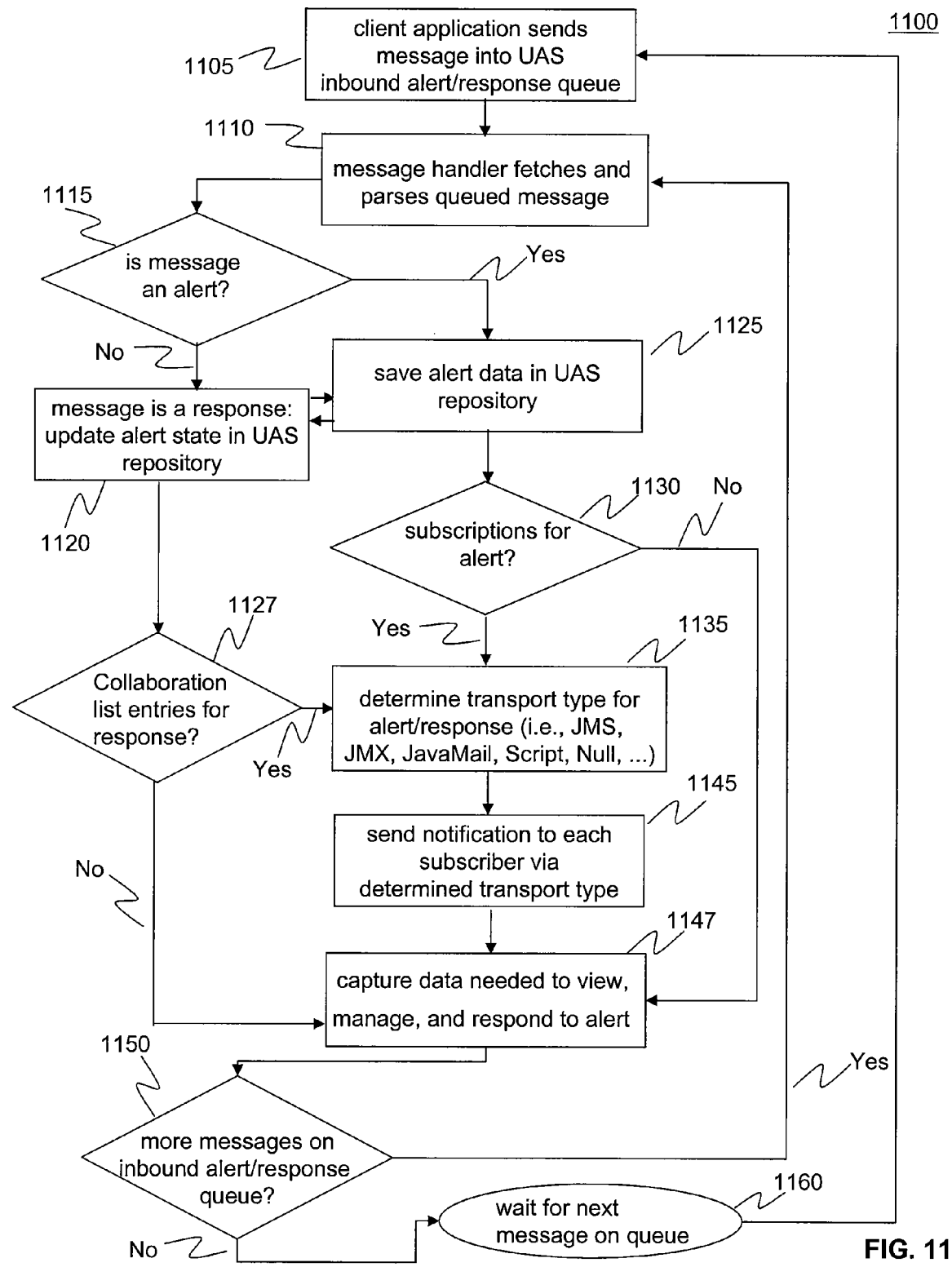
FIG. 11 is a flowchart representing a method for alert management, according to an embodiment of the invention.
Figure 12:
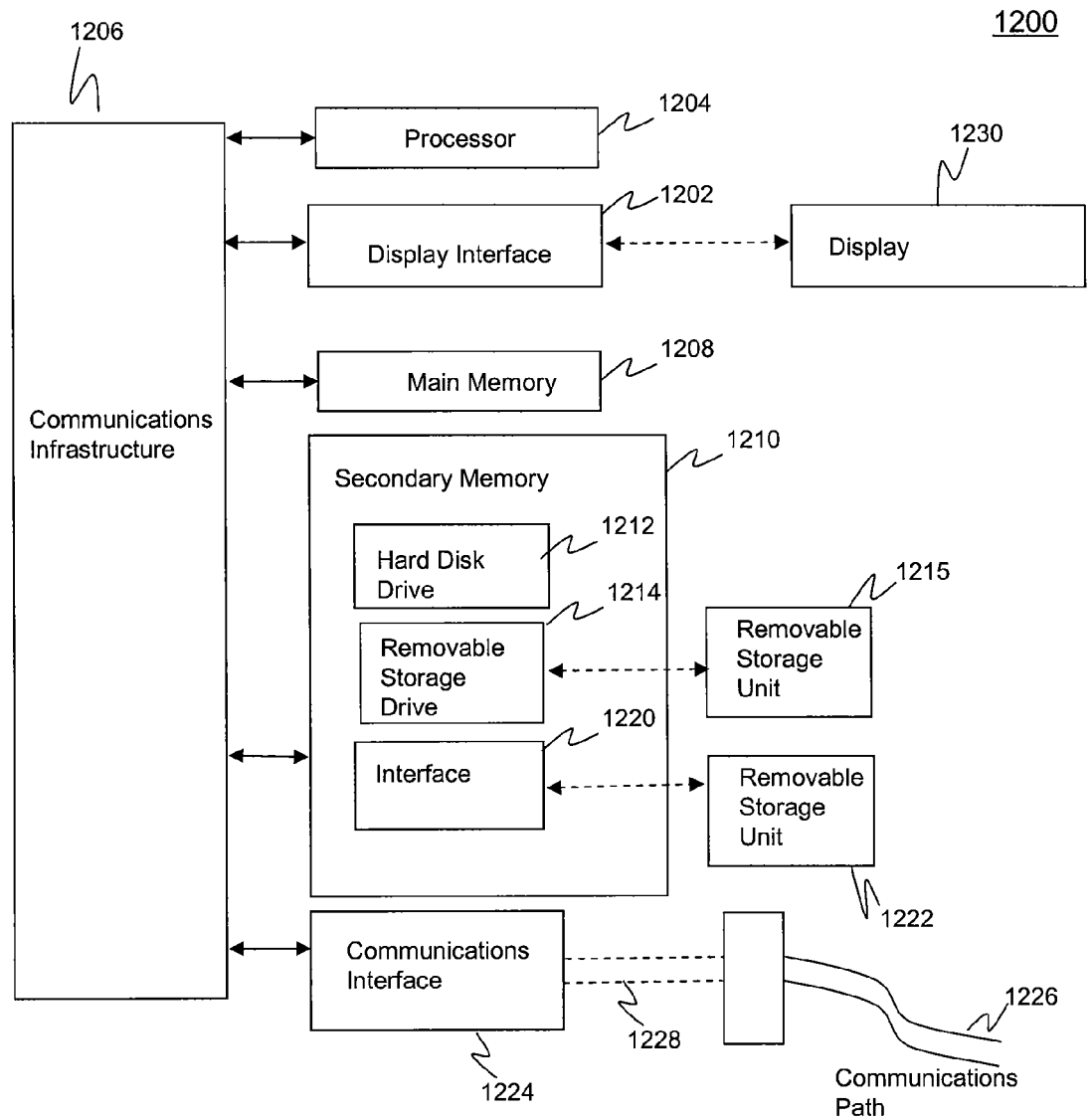
FIG. 12 illustrates an example computer system useful for implementing components of the invention, according to an embodiment of the invention.

This section describes a method and system for alert management and distribution according to embodiments of the invention as illustrated in FIGS. 11 and 12.

3.1 Alert Management Method

This section describes a method and system for alert management and distribution according to embodiments of the invention as illustrated in FIG. 11.

FIG. 11 is a flowchart 1100 illustrating steps by which alert management is performed, in accordance with an embodiment of the present invention.

More particularly, flowchart 1100 illustrates the steps by which an alert management system receives keys and other fields, applies rules to the data, and performs actions. Flowchart 1100 is described with reference to the embodiments of FIGS. 1 and 2. However, flowchart 1100 is not limited to those example embodiments. Note that the steps in the flowchart do not necessarily have to occur in the order shown.

The method begins at step 1105 wherein a client application sends message into the UAS inbound alert/response queue. Depending on the type of message, the message will either be placed into the inbound alert queue 122 (i.e., if the message is an alert) or response queue 117 (i.e., if the message is a response to an active alert instance). In an embodiment, responses are associated with existing alert instances by a unique alert ID.

In step 1110, a message handler fetches and parses the message queued in step 1105. If the message is an alert, the message is fetched and parsed by alert message handler 125. Similarly, if the message is a response to an active alert, the message is fetched and parsed by response message handler 135.

In step 1115, an evaluation is made regarding whether the message is an alert based on the parsing in step 1110. If it is determined that the message is not an alert (i.e., the message is a response), control is passed to step 1120. If it is determined in step 1115 that the message is an alert, control is passed to step 1125.

In step 1120, the alert state is updated in the UAS repository 205 based upon the contents of the response and the updated alert state is saved with alert data in the UAS repository in step 1125. In an embodiment, the alert state may be updated in UAS database 105. After the alert state is updated in the UAS repository, control is passed to step 1127.

In step 1127, an evaluation is made regarding whether there are collaboration list entries for the response message. In this step, when a response comes in on one or more channels, it is determined which, if any, collaboration list entries exist for the response. If it is determined that no there are no collaboration list entries corresponding to the response message, then control is passed to step 1147. If it determined there are collaboration list entries that correspond to the response message, then control is passed to step 1135.

In step 1125 alert data fetched and parsed in step 1110 is saved in UAS repository 205 and control is passed to step 1130. In an embodiment, the alert data may be saved in UAS database 105.

In step 1130, an evaluation is made regarding whether there are subscriptions to the alert message, based on the registered subscribers for alert messages. In this step, when a new alert instance or response comes in on one or more channels, it is determined which, if any, users are subscribed to these channels. If it is determined that no there are no subscriptions corresponding to the alert message, then control is passed to step 1147. If it determined there are subscriptions that correspond to the alert message, then control is passed to step 1135.

In step 1135, the transport type is determined for notifications based upon the target types in the subscriptions identified in step 1130. In an embodiment, step 1135 is performed by Target Type Manager 110 to determine the appropriate target transport technology (i.e., one or more of JMS, JMX, JavaMail, Script, Null, SMS, SMTP email, Instant Message, alphanumeric page, and text message) before control is passed to 1145.

In step 1145, a notification of the alert or response is sent to each subscriber identified in step 1130 via the corresponding transport types identified in step 1135, and control is passed to step 1147.

In step 1147, data needed to view, manage, and respond to the alert is captured and control is passed to step 1150. In an embodiment, data is captured for later viewing and manipulation via UAS console 228 and UAS administration interface 226 within UAS Runtime Management Console 224.

In step 1150, an evaluation is made regarding whether there are more messages queued in the inbound alert/response queues. If it is determined that more messages are queued, then control returns to step 1110. Accordingly, the process described above involving steps 1110-1347 is repeated until there are no more messages on the inbound alert/response queue. The reiterations of steps 1110-1347 stop when it is determined in step 1150 that there are no additional alerts remaining in the inbound queue 122 and response queue 117 to be processed. When it is determined that no additional alerts are in inbound queue 122 and no more responses are in response queue 117, control is passed to step 1160 where the UAS engine waits for the next alert or response.

The lifecycle of an alert does not end with step 1160. For example, a user may still be working on an alert after step 1160 and may complete it and send a corresponding response at a subsequent time. In step 1160, if there are no more messages to process, the UAS engine will wait on the inbound queue 122 and response queue 117 until an alert or response arrives. FIG. 11 illustrates how the UAS process, but does not depict the full lifecycle of an alert.

3.2 Target Types

Target types are described in this section with reference to the embodiment of FIG. 1. However, the Target Types are not limited to that example embodiment. The alerts server and UAS Engine support multiple target types. Target types can include one or more of JMX, email, JMS, script, SMS, mobile, and Null. These target types are physically manifested to the UAS server in the sense that a Target Type Manager 130 represents them; however they are virtual in the respect that they share much of the same code. The primary distinguishing factors for target types are the parameters that they require and a few lower level classes.

The parameters supported for the JMX Target Type Manager 130 parameters include, but are not limited to, those listed and described in Table 1 below.

TABLE 1

JMX Target Type Manager Parameters

| Name | Display Name | Req | Type | Description |
|---|---|---|---|---|
| JMS_DESTINATION | Destination: | Y | String | The name of the queue or topic to deliver the message to. |
| JMS_CONNECTION_FACTORY | Connection Factory: | Y | String | The name of the connection factory. |
| JMS_MESSAGE_XSL | Transformation: | N | String | An optional transformation that is applied to the message. |

For a subscription to a target instance of the JMX target type there are no subscription parameters.

For the Email target type, JavaMail may be used to send email via the SMTP protocol. The parameters supported by the Email Target Type Manager include, but are not limited to, those listed and described in Table 2.

TABLE 2

Email Target Type Manager Parameters

| Name | Display Name | Req | Type | Description |
|---|---|---|---|---|
| SNMP_SERVER_NAME | Mail Server: | Y | String | The name of the SNMP mail server. |
| REPLY_TO_ADDRESS | Reply To: | Y | String | The email address to which replies should be directed. |
| SNMP_USER_NAME | User: | N | String | The username for the SNMP server. Most SNMP servers are not secure. |
| SNMP_PASSWORD | Password: | N | String | The password for the SNMP server. Most SNMP servers are not secure. |
| AMS_BASE_URL | UAS URL: | N | String | The base URL for the UAS web client. This can optionally be used to construct http links to the UAS web client. |

TABLE 2-continued

Email Target Type Manager Parameters

| Name | Display Name | Req | Type | Description |
|---|---|---|---|---|
| EMAIL_SUBJECT_XSL | | N | String | An optional transformation, which will construct the subject line for the email. If not configured the subject defaults to "UAS Alert Notification." |
| EMAIL_BODY_XSL | | N | String | An optional transformation, which will construct the body of the email. |

For a subscription to a target instance of the Email target type, the supported parameters include, but are not limited to, those listed and described in Table 3.

TABLE 3

Email Target Parameters

| Name | Display Name | Req | Type | Description |
|---|---|---|---|---|
| EMAIL_ADDRESS | Mail Address: | Y | String | The email address to be used for this subscription. |

For the JMS target type, Target Type Manager 130 will deliver alert messages via a JMS Queue or Topic. The parameters supported for the JMS Target Type Manager 130 include, but are not limited to, those listed and described in Table 4.

TABLE 4

JMS Target Parameters

| Name | Display Name | Req | Type | Description |
|---|---|---|---|---|
| JMS_DESTINATION | Destination: | Y | String | The name of the queue or topic to deliver the message to. |
| JMS_CONNECTION_FACTORY | Connection Factory: | Y | String | The name of the connection factory. |
| JMS_MSG_PROPERTY | | N | String | This defines a property map and contains the name of the property being mapped. There can be N number of these parameters. |
| JMS_MSG_PROPMAP_{NAME} | | N | String | This is the property mapping(XSL) for a property defined by a JMS_MSG_PROPERTY entry. |

TABLE 4-continued

JMS Target Parameters

| Name | Display Name | Req | Type | Description |
|---|---|---|---|---|
| JMS_MESSAGE_XSL | Transformation: | N | String | {NAME} is the name contained in the JMS_MSG_PROPERTY entry. There can be N number of these parameters. An optional transformation that is applied to the message. |

For a subscription to a target instance of the JMS target type there are no subscription parameters.

For the Mobile target type, Target Type Manager 130 will deliver alert messages via a JMS Queue. The parameters supported for the Mobile Target Type Manager 130 include, but are not limited to, those listed and described in Table 5 below.

TABLE 5

Mobile Target Manager Parameters

| Name | Display Name | Req | Type | Description |
|---|---|---|---|---|
| JMS_DESTINATION | Destination: | Y | String | The name of the queue or topic to deliver the message to. |
| JMS_CONNECTION_FACTORY | Connection Factory: | Y | String | The name of the connection factory. |
| JMS_MESSAGE_XSL | Transformation: | N | String | An optional transformation that is applied to the message. |

For a subscription to a target instance of the Mobile target type the supported parameters, include, but are not limited to, those listed and described in Table 6.

TABLE 6

Mobile Target Instance Parameters

| Name | Display Name | Req | Type | Description |
|---|---|---|---|---|
| MOBILE_AGENT_NAME | Agent Name: | Y | String | The name of the QAnywhere Agent. |
| MOBILE_QUEUE_NAME | Queue Name: | Y | String | The name of the queue on the mobile device. |

A Null target type supports no parameters and is a means of registering interest in a set of alerts without receiving notifications. These alerts may be viewable via a graphical user interface console such as a web-based interface.

3.3 Alert State Manager

The Alert State Manager is described in this section with reference to the embodiment of FIG. 1. However, the Alert State Manager is not limited to that example embodiment. In an embodiment of the present invention, Alert State Manager 110 is a stateful session JavaBean that is responsible for maintaining in memory state of individual alerts as well as persisting alerts and responses to the UAS database. Alert State Manager 110 is also responsible for maintaining timers for the escalation of alerts as well as for alert suppression to prevent alert storms. Additionally, Alert State Manager 110 is responsible for sending alert notifications, which have either originated from Alert Message Handler 125 or that have been triggered as a result of a response or escalation, to the topic used by Target Type Managers 130.

In generating the alert notification, Alert State Manager 110 must fill in subscription information for each target instance and set the AMS_TARGET_TYPE and AMS_TARGET_NAME message properties so that the proper Target Type Manager will receive the message and so that the proper target instance metadata will be used to deliver the notification.

In an embodiment, Alert State Manager 110 includes an initialization means when the UAS server starts so that the state of active alerts can be retrieved from the UAS database. For example, with reference to the embodiment illustrated in FIG. 1, Alert State Manager 110 may include an initialization module configured to fetch alert states for any active alerts from UAS database 105. This may involve use of a Java servlet.

3.4 Alert Lifecycle

The Alert Lifecycle is described in this section with reference to the embodiment of FIG. 1. However, the Alert Lifecycle is not limited to that example embodiment. The alert lifecycle refers to the process that a managed alert goes through before reaching completion. The lifecycle for an alert has several important aspects or features.

The first aspect deals with alert suppression, which is a means of preventing alert storms. Alert suppression occurs when an alert message is received in which the Suppression Key in the alert message is the same as an existing alert and the alert type has a value greater than 0 for the suppression period and the timer that is measuring this period has not expired. Suppressed alerts are recorded in the UAS database 105 unless the system is configured not to store suppressed alerts. In an embodiment, suppressed alerts that are recorded in UAS database 105 are viewable in a web client interface.

The second aspect deals with alert escalation, which is a means of notifying a second group of users when an alert has not been completed during a specified time period. Alert escalation occurs when a channel for a given alert has a configured escalation channel and timeout period and the alert has not been completed prior to the expiration of the timeout period. Additionally, users can cause an immediate alert escalation by sending an Escalate notification type.

The following section describes in pseudo code the manual and alert escalation process, in accordance with an embodiment of the present invention.

```
// Background escalation process
ProcessEscalations ( ) {
    Foreach (Alert instance in an Active state) {
        Foreach (Channel in the Alert channel list) {
            If (Alert.Channel.EscalationTimer.Elapsed == true) AND
               (Alert.Channel.Escalated == false) {
                Foreach (Channel in the escalation list) {
                    Foreach (Subscription that includes the escalation Channel) {
                        Alert.CollaborationList.Insert (Subscription.Target);
                    }
                }
            }
        }
    }
```

-continued

```
        If (Alert.CollaborationList.Changed == true) {
            Increment (Alert.EscalationCount); // this was initialized to zero
            Foreach (Target in the Alert Collaboration list) {
                Target.Send (Alert.Escalation.Notification);
            }
        }
    }
}
// Escalate response process
ProcessEscalationResponses( ) {
    Receive Escalation Response message;
    Foreach (Channel in the Alert Channel list associated with the
    response) {
        If (Alert.Channel.Escalated == false) {
            Foreach (Channel in the escalation list) {
                Foreach (Subscription that includes the escalation Channel) {
                    Alert.CollaborationList.Insert (Subscription.Target);
                }
            }
        }
    }
    If (Alert.CollaborationList.Changed == true) {
        Increment (Alert.EscalationCount); // this was initialized to zero
        Foreach (Target in the Alert Collaboration list) {
            Target.Send (Alert.Escalation.Notification);
        }
    }
}
```

The third aspect of the alert lifecycle is related to rules that govern the valid state transitions for an alert. The valid states for an alert include, but are not limited to: active; complete; unmanaged; and suppressed. In an embodiment, a user such as a manager, may only wish to receive notifications of completed alerts (i.e., when an alert state is set to complete) and can set subscriptions accordingly. The rules governing state transition include, but are not limited to, those listed and described in Table 7.

TABLE 7

Rules Governing Alert State Transition

1. Alerts that are completed could only be marked active through a reactivate response, which is only available on alerts that enter a completed state. Meaning the user will not be given the choice to reactivate unless the alert is completed.
2. Alerts that are unmanaged cannot transition to a managed state (active or complete) or become suppressed.
3. Suppressed alerts cannot transition to an unmanaged, active, or completed state.

Another point regarding the alert lifecycle relates to valid alert responses. Alert Responses include, but are not limited to, those listed and described in Table 8 below.

TABLE 8

Alert Responses

1. Alert Responses can be issued which effectively do not change the alert state, meaning that the alert remains in the active state.
2. If no Alert Response is configured that completes an alert then a generic completion response will be added to the available list of responses in the DriverAlert message.

The following section describes in pseudo code the alert lifecycle, which may be modeled in the Business Process Execution Language (BPEL), in accordance with an embodiment of the present invention. In an embodiment, the BPEL is language used to implement Alert Lifecycle Manager 120. As would be appreciated by those skilled in the relevant art(s), languages other than BPEL, such as Java, may be used to model the alert lifecycle.

```
alertLifecycle( ) {
    receive message in PersonalAlert XSD form;
    extract alert type from message;
    // check to see if this is a managed alert(only managed if it is defined
    // in the metadata)
    if (metadata.exists(alertType) == true) {
        // This is a managed alert. Check to see if storm suppression
        // is enabled. Storm suppression is enabled when
        // suppression period is greater than 0
        if (metadata.thisAlertType.suppressionPeriod > 0) {
            if (exists(suppressionTimer(alertType, suppressionKey)) == true) {
                alertState = "suppressed";
                // Check to see if we store suppressed alerts
                if (metadata.purge.suppressed > 0) {
                    invoke AlertManager service to persist;
                }
            }
            else {
                alertState = "active";
                new suppressionTimer(suppressionKey, period);
                while (alertState != "complete") {
                    invoke AlertManager service to persist alert;
                    invoke DriverAlertBuilder service;
                    deliver DriverAlert message;
                    wait for response or timer escalation notice;
                }
            }
        }
        else {
            alertState = "active";
            while (alertState != "complete") {
                invoke AlertManager service to persist alert;
                invoke DriverAlertBuilder service;
                deliver DriverAlert message;
                wait for response or timer escalation notice;
            }
        }
    }
    else {
        // This is an unmanaged alert.
        invoke AlertManager service to persist alert;
        invoke DriverAlertBuilder service;
        deliver DriverAlert message;
    }
}
```

3.5 Alerts Server Database

The Alerts Server Database is where the alerts server persists information pertaining to the state of the alert within the lifecycle. In an embodiment the Alerts Server Database can be UAS DB 105 depicted in FIG. 1. Alerts Server Database may be a database that is local or remote to the alerts server. The Alerts Server Database may be one or more of a relational database, a data store, a centralized database, and a distributed database.

According to an embodiment, a unique identifier is assigned to each alert message that is persisted or stored in the database. This unique identifier may be used to identify the alert once it has been persisted. The Alert Server Database is not a warehouse for permanently storing alerts as alerts will be purged and deleted from the Alert Server Database based on configured intervals for each alert state. In an embodiment, a user interface allows for the configured intervals to be changed or tuned by administrators for each alert state.

3.6 Alert Message XML Schema Definition

The inbound alert message is also referred to as an alert message. The alert message format, contents, and data elements of an example embodiment are defined by the Extensible Markup Language (XML) Schema Definition (XSD) below.

According to an embodiment, channels may be selected for the alert message. Channels are described in detail in section 2.7 above.

In an embodiment, Short/Long text fields are used to carry an alert message. For example, an Alert message can contain a static string and field values as shown in the Extensible Markup Language (XML) Schema Definition (XSD) below. As shown in the following XML XSD, a user can add or delete fields from an alert message body.

```
<?xml version="1.0" encoding="UTF-8"?>
<xs:schema xmlns:xs="http://www.w3.org/2001/XMLSchema"
elementFormDefault="qualified" attributeFormDefault="unqualified">
    <xs:element name="PersonalAlerts">
        <xs:complexType>
            <xs:sequence>
                <xs:element name="Version" type="xs:string">
                    <xs:annotation>
                        <xs:documentation>This is the version of
the message definition.</xs:documentation>
                    </xs:annotation>
                </xs:element>
                <xs:element name="PersonalAlert"
type="personalAlertType" maxOccurs="unbounded">
                    <xs:annotation>
                        <xs:documentation>This represents a single
alert instance.</xs:documentation>
                    </xs:annotation>
                </xs:element>
            </xs:sequence>
        </xs:complexType>
    </xs:element>
    <xs:complexType name="personalAlertType">
        <xs:sequence>
            <xs:element name="DateTimeStamp" type="xs:dateTime">
                <xs:annotation>
                    <xs:documentation>This is the date and time that
the alert was issued.</xs:documentation>
                </xs:annotation>
            </xs:element>
            <xs:element name="SourceApplication" type="xs:string">
                <xs:annotation>
                    <xs:documentation>This is the name of the source
application that issued the alert.</xs:documentation>
                </xs:annotation>
            </xs:element>
            <xs:element name="AlertID" type="xs:string">
                <xs:annotation>
                    <xs:documentation>This is an external name for the
alert. It is NOT used by the alert server for
identification.</xs:documentation>
                </xs:annotation>
            </xs:element>
            <xs:element name="AlertType" type="xs:string">
                <xs:annotation>
                    <xs:documentation>This is the type classification
for the alert that can correspond to an alert type defined in
AMS_ALRT_TYPE. If the alert type is not present or not
defined in AMS_ALRT_TYPE the alert is
unmanaged.</xs:documentation>
                </xs:annotation>
            </xs:element>
            <xs:element name="SuppressionKey" type="xs:string"
nullable="true">
                <xs:annotation>
                    <xs:documentation>This is a key or correlation
```

```
value used in determining if two separate alert instances are the same
and if redundant instances should be suppressed.</xs:documentation>
            </xs:annotation>
        </xs:element>
        <xs:element name="Variables" type="variablesType">
            <xs:annotation>
                <xs:documentation>This is the set of variables for
this alert. Currently the alert server only uses these for dynamic
subscriptions, however there may be other uses in the
future.</xs:documentation>
            </xs:annotation>
        </xs:element>
        <xs:element name="Contents" type="contentsType">
            <xs:annotation>
                <xs:documentation>This is the content for the alert.
Multiple content nodes can exist based on locale. Only a single content
node should exist for a given locale value.</xs:documentation>
            </xs:annotation>
        </xs:element>
        <xs:element name="Channels" type="channelsType">
            <xs:annotation>
                <xs:documentation>This is the set of channels that
the alert should be delivered on.</xs:documentation>
            </xs:annotation>
        </xs:element>
        <xs:element name="Links">
            <xs:annotation>
                <xs:documentation>This is a set of links that can be
associated with the alert.</xs:documentation>
            </xs:annotation>
            <xs:complexType>
                <xs:sequence>
                    <xs:element name="Link" minOccurs="0"
maxOccurs="unbounded">
                        <xs:annotation>
                            <xs:documentation>This is a
single link instance.</xs:documentation>
                        </xs:annotation>
                        <xs:complexType>
                            <xs:sequence>
                                <xs:element
name="URL" type="xs:string">
 <xs:annotation>
 <xs:documentation>This is a URL to the linked
resource.</xs:documentation>
 </xs:annotation>
                                </xs:element>
                                <xs:element
name="Comment" type="xs:string" minOccurs="0">
 <xs:annotation>
 <xs:documentation>This is a comment for the linked
resource.</xs:documentation>
 </xs:annotation>
                                </xs:element>
                            </xs:sequence>
                        </xs:complexType>
                    </xs:element>
                </xs:sequence>
            </xs:complexType>
        </xs:element>
    </xs:sequence>
</xs:complexType>
<xs:complexType name="variablesType">
    <xs:sequence>
        <xs:element name="Variable" type="variableType"
minOccurs="0" maxOccurs="unbounded">
            <xs:annotation>
                <xs:documentation>This represents a variable definition and assignment.
The name attribute is the name of the variable being defined and the value
is contained by the tag. Variables that start with AMS_ are reserved
for internal use.</xs:documentation>
            </xs:annotation>
        </xs:element>
    </xs:sequence>
</xs:complexType>
<xs:complexType name="contentsType">
    <xs:sequence>
        <xs:element name="Content" type="contentType"
maxOccurs="unbounded">
            <xs:annotation>
                <xs:documentation>This is a single content
instance.</xs:documentation>
            </xs:annotation>
        </xs:element>
    </xs:sequence>
</xs:complexType>
<xs:complexType name="channelsType">
    <xs:sequence>
        <xs:element name="Channel" type="xs:string"
maxOccurs="unbounded">
            <xs:annotation>
                <xs:documentation>This is a single channel
instance.</xs:documentation>
            </xs:annotation>
        </xs:element>
    </xs:sequence>
</xs:complexType>
<xs:complexType name="variableType">
    <xs:simpleContent>
        <xs:extension base="xs:string">
            <xs:attribute name="name" type="xs:string"
use="required"/>
        </xs:extension>
    </xs:simpleContent>
</xs:complexType>
<xs:complexType name="contentType">
    <xs:sequence>
        <xs:element name="Locale" type="xs:string">
            <xs:annotation>
                <xs:documentation>The locale for which this content is
intended.</xs:documentation>
            </xs:annotation>
        </xs:element>
        <xs:element name="ShortText" type="xs:string">
            <xs:annotation>
                <xs:documentation>The short text form of the content for
Short Message Service (SMS) devices.</xs:documentation>
            </xs:annotation>
        </xs:element>
        <xs:element name="LongText" type="xs:string" minOccurs="0">
            <xs:annotation>
                <xs:documentation>The long text form of the
content.</xs:documentation>
            </xs:annotation>
        </xs:element>
        <xs:element name="ExtendedContent"
type="extendedContentType" minOccurs="0">
            <xs:annotation>
                <xs:documentation>Any additional content that was
delivered as part of the alert message.</xs:documentation>
            </xs:annotation>
        </xs:element>
    </xs:sequence>
</xs:complexType>
<xs:complexType name="extendedContentType">
    <xs:sequence>
        <xs:any namespace="##any" processContents="lax"
minOccurs="0" maxOccurs="unbounded"/>
    </xs:sequence>
</xs:complexType>
</xs:schema>
```

The following tables describe the intended usage and content for each data element within alert messages. The data types for the data elements are described in the preceding alert message XSD. Table 9 lists the data elements for Personal alert messages, according to an embodiment of the invention.

TABLE 9

Personal Alert Message Elements

| Elements | Complex types |
|---|---|
| PersonalAlerts | channelsType |
| | contentsType |
| | contentType |
| | extendedContentType |
| | personalAlertType |
| | variablesType |
| | variableType |

The following tables describe each of the PersonalAlerts element listed in table 9 in further detail. Tables 10-12 below correlate elements (e.g., PersonalAlerts, PersonalAlerts/Versions, and PersonalAlerts/PersonalAlert) to child data types, according to an embodiment of the invention.

TABLE 10

PersonalAlerts Element
element PersonalAlerts

| children | Vesion PersonalAlert |
|---|---|

TABLE 11

PersonalAlerts/Version Element
element PersonalAlerts/Version

| type | xs:string | |
|---|---|---|
| annotation | documentation | This is the version of the message definition. |

TABLE 12

PersonalAlerts/PersonalAlert Element
element PersonalAlerts/PersonalAlert

| type | personalAlertType |
|---|---|
| children | DateTimeStamp SourceApplication AlertID AlertType SuppressionKey Variables Contents Channels Links |
| annotation | documentation   This represents a single alert instance. |

The following tables describe each of the data types/complex types listed in table 9 in further detail. Tables 13-15 below correlate complex data types to child data types and document how they are used, according to an embodiment of the invention.

TABLE 13

Complex Data Types and Elements complexType channelsType

| children used by | Channel element | personalAlertType/Channels element channelsType/Channel |
|---|---|---|
| type annotation | xs:string documentation | This is a single channel instance. | complexType contentsType

| children used by | Content element | personalAlertType/Contents element contentsType/Content |
|---|---|---|
| type children annotation | contentType Locale ShortText LongText ExtendedContent documentation | This is a single content instance. | complexType contentType

| children used by | Locale ShortText LongText ExtendedContent element | contentsType/Content element contentType/Locale |
|---|---|---|
| type annotation | xs:string documentation | The locale for which this content is intended. element contentType/ShortText |
| type annotation | xs:string documentation | The short text form of the content for SMS devices. element contentType/LongText |
| type annotation | xs:string documentation | The long text form of the content. element contentType/ExtendedContent |
| type annotation | extendedContentType documentation | Any additional content that was delivered as part of the alert message. |

TABLE 13-continued

Complex Data Types and Elements complexType extendedContentType

| | | |
|---|---|---|
| used by | element | contentType/ExtendedContent |
| | | complexType personalAlertType |
| children | DateTimeStamp SourceApplication AlertID AlertType SuppressionKey Variables Contents Channels Links | |
| used by | element | PersonalAlerts/PersonalAlert |
| | | element personalAlertType/DateTimeStamp |
| type | xs:dateTime | |
| annotation | documentation | This is the date and time that the alert was issued. |
| | | element personalAlertType/SourceApplication |
| type | xs:string | |
| annotation | documentation | This is the name of the source application that issued the alert. |
| | | element personalAlertType/AlertID |
| type | xs:string | |
| annotation | documentation | This is an external name for the alert. It is NOT used by the alert server for identification. |
| | | element personalAlertType/AlertType |
| type | xs:string | |
| annotation | documentation | This is the type classification for the alert that can correspond to an alert type defined in AMS_ALRT_TYPE. If the alert type is not present or not defined in AMS_ALRT_TYPE, the alert is unmanaged. |

TABLE 14 personalAlert/Type Elements element personalAlertType/SuppressionKey

| | | |
|---|---|---|
| type | xs:string | |
| annotation | documentation | This is a key or correlation value used in determining if two separate alert instances are the same and if redundant instances should be suppressed. |
| | | element personalAlertType/Variables |
| type | variablesType | |
| children | Variable | |
| annotation | documentation | This is the set of variables for this alert. Currently the alert server only uses these for dynamic subscriptions, however there may be other uses. |
| | | element personalAlertType/Contents |
| type | contentsType | |
| children | Content | |
| annotation | documentation | This is the content for the alert. Multiple content nodes can exist based on locale. Typically a single content node should exist for a given locale value. |
| | | element personalAlertType/Channels |
| type | channelsType | |
| children | Channel | |
| annotation | documentation | This is the set of channels that the alert should be delivered on. |
| | | element personalAlertType/Links |
| children | Link | |
| annotation | documentation | This is a set of links that can be associated with the alert. |
| | | element personalAlertType/Links/Link |
| children | URL Comment | |
| annotation | documentation | This is a single link instance. |

TABLE 14-continued personalAlert/Type Elements element personalAlertType/Links/Link/URL

| type | xs:string | |
|---|---|---|
| annotation | documentation | This is a URL to the linked resource. | element personalAlertType/Links/Link/Comment

| type | xs:string | |
|---|---|---|
| annotation | documentation | This is a comment for the linked resource. |

TABLE 15 variablesType Elements and Complex Data Types complexType variablesType

| children | Variable | |
|---|---|---|
| used by | element | personalAlertType/Variables |
|  |  | element variablesType/Variable |
| type | variableType | |
| attributes | Name Type Use Default Fixed Annotation | |
|  | name xs:string required | |
| annotation | documentation | This represents a variable definition and assignment. The name attribute is the name of the variable being defined and the value is contained by the tag. Variables that start with AMS_ are reserved for internal use. | complexType variableType

| type | extension of xs:string | |
|---|---|---|
| used by | element | variablesType/Variable |
| attributes | Name Type Use Default Fixed Annotation | |
|  | name xs:string required | |

3.7 Alert Metadata API

The following section describes an application programming interface (API) that covers configuration metadata that is managed by an Eclipse-based Unified Alert Service (UAS) plug-in, in accordance with an embodiment of the present invention. Eclipse is an open-source Integrated development environment (IDE) written primarily in Java. The API described in Table 16 below abstracts the data model from an alert management system configuration graphical user interface (GUI) and provides a reusable wrapper in the event that other products that use the UAS have GUIs that are not Eclipse based.

3.7.1 AMSMetadataFactory

According to an embodiment of the invention, the AMSMetadataFactory object is the primary interface to the Alert Metadata API. Table 16 outlines the exposed methods.

TABLE 16

AMSMetadataFactory Object

| Method | Return | Parameters | Description |
|---|---|---|---|
| newInstance | AMSMetadataFactory | Connection dbConnection | A static method that creates a new instance of the AMSMetadataFactory. |
| newAlertType | AMSAlertType | String name, long suppressPeriod | Creates a new AMSAlertType object. |
| getAlertType | AMSAlertType | String name | Returns an existing AMSAlertType object for the specified name. |
| getAlertTypes | Iterator | | Returns an iterator for a list of AMSAlertType objects. |
| newChannel | AMSChannel | String name | Creates a new AMSChannel object. |
| getChannel | AMSChannel | String name | Returns an existing AMSChannel object for the specified name. |
| getChannels | Iterator | | Returns an iterator for a list of AMSChannel objects. |

TABLE 16-continued

AMSMetadataFactory Object

| Method | Return | Parameters | Description |
| --- | --- | --- | --- |
| newRole | AMSRole | String application, String action | Creates a new AMSRole object. |
| getRole | AMSRole | String application, String action | Returns an existing AMSRole object for the specified application and action pair. |
| getRoles | Iterator | | Returns an iterator for a list of AMSRole objects. |
| newTargetInst | UASTargetInst | String name, String type | Creates a new UASTargetInst object. |
| getTargetInst | UASTargetInst | String name | Returns an existing UASTargetInst object for the specified name. |
| getTargetInsts | Iterator | | Returns an iterator for a list of UASTargetInst objects. |
| persist | boolean | | Writes all objects to the data store. |
| commit | boolean | | Commits changes to the data store for a transacted data store. |
| rollback | boolean | | Rolls back changes to the data store for a transacted data store. |

4. Example Computer Implementation

Various aspects of the present invention can be implemented by software, firmware, hardware, or a combination thereof. FIG. 12 illustrates an example computer system 1200 in which the present invention, or portions thereof, can be implemented as computer-readable code. For example, the methods illustrated by flowchart 1100 of FIG. 11 can be implemented in system 1200. Various embodiments of the invention are described in terms of this example computer system 1200. After reading this description, it will become apparent to a person skilled in the relevant art how to implement the invention using other computer systems and/or computer architectures.

Computer system 1200 includes one or more processors, such as processor 1204. Processor 1204 can be a special purpose or a general purpose processor. Processor 1204 is connected to a communication infrastructure 1206 (for example, a bus, or network).

Computer system 1200 also includes a main memory 1208, preferably random access memory (RAM), and may also include a secondary memory 1210. Secondary memory 1210 may include, for example, a hard disk drive 1212, a removable storage drive 1214, flash memory, a memory stick, and/or any similar non-volatile storage mechanism. Removable storage drive 1214 may comprise a floppy disk drive, a magnetic tape drive, an optical disk drive, a flash memory, or the like. The removable storage drive 1214 reads from and/or writes to a removable storage unit 1218 in a well known manner. Removable storage unit 1218 may comprise a floppy disk, magnetic tape, optical disk, etc. which is read by and written to by removable storage drive 1214. As will be appreciated by persons skilled in the relevant art(s), removable storage unit 1218 includes a computer usable storage medium having stored therein computer software and/or data.

In alternative implementations, secondary memory 1210 may include other similar means for allowing computer programs or other instructions to be loaded into computer system 1200. Such means may include, for example, a removable storage unit 1222 and an interface 1220. Examples of such means may include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to computer system 1200.

Computer system 1200 may also include a communications interface 1224. Communications interface 1224 allows software and data to be transferred between computer system 1200 and external devices. Communications interface 1224 may include a modem, a network interface (such as an Ethernet card), a communications port, a PCMCIA slot and card, or the like. Software and data transferred via communications interface 1224 are in the form of signals which may be electronic, electromagnetic, optical, or other signals capable of being received by communications interface 1224. These signals are provided to communications interface 1224 via a communications path 1226. Communications path 1226 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1218, removable storage unit 1222, and a hard disk installed in hard disk drive 1212. Signals carried over communications path 1226 can also embody the logic described herein. Computer program medium and computer usable medium can also refer to memories, such as main memory 1208 and secondary memory 1210, which can be memory semiconductors (e.g. DRAMs, etc.). These computer program products are means for providing software to computer system 1200.

Computer programs (also called computer control logic) are stored in main memory 1208 and/or secondary memory 1210. Computer programs may also be received via communications interface 1224. Such computer programs, when executed, enable computer system 1200 to implement the present invention as discussed herein. In particular, the computer programs, when executed, enable processor 1204 to implement the processes of the present invention, such as the steps in the methods illustrated by flowchart 1100 of FIG. 11 discussed above. Accordingly, such computer programs represent controllers of the computer system 1200. Where the invention is implemented using software, the software may be stored in a computer program product and loaded into computer system 1200 using removable storage drive 1214, interface 1220, hard drive 1212, or communications interface 1224.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

5. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for dynamically monitoring, processing, and managing alerts, comprising:
    (a) receiving a message from a client, wherein said message is one of an alert or a response to an existing alert, and wherein said message comprises a plurality of data fields;
    (b) parsing said message to determine if said message is an alert or a response to an existing alert;
    (c) updating an alert state if it is determined in step (b) that said message is a response to an existing alert, wherein the updated alert state is stored in a data repository;
    (d) saving alert data in a data repository if it is determined in step (b) that said message is an alert;
    (e) sending notifications regarding said message to a collaboration list of registered subscribers, wherein said subscribers are associated with one or more subscription channels, and wherein said collaboration list dynamically expands over time including at least additional subscribers or subscription channels based upon alert escalations; and
    (f) repeating steps (b)-(e) in response to determining that more messages have been received,
    wherein said plurality of data fields include a suppression time, and suppression keys indicating rules regarding when notifications will be suppressed in step (e), wherein said suppression keys are identifiers passed into an alert message that, combined with the alert type that is also passed into the alert, uniquely identify a group of alerts that can be suppressed within a suppression period, wherein the suppression time and suppression keys are independently defined.

2. The method of claim 1, wherein said collaboration list comprises a community of one or more registered subscribers responsible for resolving and monitoring an alert.

3. The method of claim 1, wherein said plurality of data fields include at least a unique alert identifier and a state identifier.

4. The method of claim 3, wherein the state identifier is one of Active, Complete, Unmanaged, and Suppressed.

5. The method of claim 1, wherein registered subscriptions are associated with at least a user, a channel, and a target.

6. The method of claim 5, wherein said target is associated with a transport type.

7. The method of claim 6, wherein said transport type includes one or more of JavaMail, Simple Mail Transfer Protocol (SMTP) email, facsimile, JMS, Java Management Extensions (JMX), instant messages, text message, alphanumeric pages, Short Message Service (SMS) messages, script, and null target instances.

8. The method of claim 1, wherein said alerts are system alarm messages, and wherein system alarm messages are triggered by system events.

9. The method of claim 1, wherein data stored in steps (c) and (d) is provided as input into a user interface used to manage and respond to an alert.

10. A system comprising:
    a processor; and
        a memory storing control logic, that when executed by the processor, causes the processor to perform operations for dynamically monitoring, processing, and managing alerts, the operations comprising:

receiving a message from a client, wherein said message is one of an alert or a response to an existing alert, and wherein said message is comprised of a plurality of data fields;

parsing said message;

determining if said message is an alert or a response to an existing alert;

updating and storing an alert state in a data repository if the parsing determines that said message is a response to an existing alert;

saving alert data in the data repository if the parsing determines that said message is an alert;

sending notifications regarding said message to a collaboration list of registered subscribers, wherein said subscribers are associated with one or more subscription channels, and wherein said collaboration list dynamically expands over time including at least additional subscribers or subscription channels based upon alert escalations, wherein said data fields include a suppression time, and suppression keys indicating rules regarding when the system will suppress sending notifications, wherein the suppression keys are identifiers passed into an alert message that, combined with the alert type that is also passed into the alert, uniquely identify a group of alerts that can be suppressed within a suppression period, and wherein the suppression time and suppression keys are independently defined.

11. The system of claim 10, wherein said collaboration list comprises a community of one or more registered subscribers responsible for resolving and monitoring an alert.

12. The system of claim 11, wherein said plurality of data fields include at least a unique alert identifier and a state identifier.

13. The system of claim 12, wherein the state identifier is one of Active, Complete, Cancel, Obsolete, Unmanaged, and Suppressed.

14. The system of claim 10, wherein registered subscriptions are associated with at least a user, a channel, and a target.

15. The system of claim 14, wherein said target is associated with a transport type.

16. The system of claim 15, wherein said transport type includes one or more of JavaMail, Simple Mail Transfer Protocol (SMTP) email, facsimile, JMS, Java Management Extensions (JMX), instant messages, text message, alphanumeric pages, Short Message Service (SMS) messages, script, and null target instances.

17. The system of claim 10, wherein said alerts are system alarm messages triggered by system events, and wherein system events include any event in a computer system detected by a computer system or a user that needs attention by one or more users.

18. The system of claim 10, wherein the stored state update data and the saved alert update data is provided as input into a graphical user interface used to manage and respond to an alert.

19. The system of claim 18, wherein said user interface includes at least graphical user interfaces for configuring user roles, targets, subscriptions, and alert lifecycles.

20. A computer program product comprising a non-transitory computer-readable storage medium having computer program logic stored thereon for enabling a processor to dynamically monitor, process, and manage alerts, the computer program logic comprising:

message receiving means for enabling a processor to receive a message from a client, wherein said message is one of an alert or a response to an existing alert, and wherein said message is comprised of a plurality of data fields;

parsing means for enabling a processor to parse said message to determine if said message is an alert or a response to an existing alert;

state update means for enabling a processor to update and store an alert state in a data repository if the parsing means determines that said message is a response to an existing alert;

alert update means for enabling a processor to save alert data in a data repository if the parsing means determines that said message is an alert; and notification means for enabling a processor to send notifications regarding said message to a collaboration list of registered subscribers, wherein said subscribers are associated with one or more subscription channels, and wherein said collaboration list dynamically expands over time including at least additional subscribers or subscription channels based upon alert escalations, wherein said data fields include a suppression time, and suppression keys indicating rules regarding when the notification means will suppress sending notifications, wherein said suppression keys are identifiers passed into an alert message that, combined with the alert type that is also passed into the alert, uniquely identify a group of alerts that can be suppressed within a suppression period, and wherein the suppression time and suppression keys are independently defined.

21. The computer program product of claim 20, wherein said collaboration list comprises a community of one or more registered subscribers responsible for resolving and monitoring an alert.

22. The computer program product of claim 20, wherein said data fields include at least a unique alert identifier and a state identifier.

23. The computer program product of claim 20, wherein the suppression period is one or more of days, hours, minutes, and seconds.

24. The computer program product of claim 20, wherein said suppression time data field is a specific duration of time, wherein the specific duration of time is one or more of days, hours, minutes, and seconds that a notification will be suppressed.

25. The computer program product of claim 20, wherein said data fields further include escalation fields.

26. The computer program product of claim 25, wherein said escalation fields include an escalation period and an escalation channel.

27. The computer program product of claim 26, wherein said escalation period is a time unit, and wherein the time unit is one or more of days, hours, minutes, and seconds.

28. The computer program product of claim 20, wherein said data fields further include response types.

29. The computer program product of claim 25, wherein said response types include one or more of Active, Complete, Escalate, or custom as defined by an administrator.

30. The computer program product of claim 26, wherein Custom response types are define the external Status an Alert can be in while the Alert is in the Active state.

31. The computer program product of claim 20, wherein said data fields further include a user role identifier.

32. The computer program product of claim 31, wherein said user role identifier can be one or more of Access, AlertAdmin, admin-role, and ChannelSubscriptionManager.

* * * * *